(12) United States Patent
Tomihashi et al.

(10) Patent No.: US 7,361,708 B2
(45) Date of Patent: Apr. 22, 2008

(54) FLUORINATED RESIN WATER DISPERSION COMPOSITION AND FLUORINATED WATER BASE COATING COMPOSITION

(75) Inventors: Nobuyuki Tomihashi, Settsu (JP); Toshirou Miura, Settsu (JP); Yoshihiro Soda, Settsu (JP); Manabu Asai, Settsu (JP); Koichirou Ogita, Settsu (JP); Hiromichi Momose, Settsu (JP); Kazuo Murakami, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/514,884

(22) PCT Filed: May 19, 2003

(86) PCT No.: PCT/JP03/06177

§ 371 (c)(1),
(2), (4) Date: Nov. 17, 2004

(87) PCT Pub. No.: WO03/106556

PCT Pub. Date: Dec. 24, 2003

(65) Prior Publication Data

US 2005/0222313 A1    Oct. 6, 2005

(30) Foreign Application Priority Data

May 20, 2002  (JP)  ............... 2002-144945
Nov. 11, 2002  (JP)  ............... 2002-327274

(51) Int. Cl.
*C07C 43/11*  (2006.01)
*C08L 27/18*  (2006.01)
*C08K 5/06*  (2006.01)
*C08J 3/05*  (2006.01)
*C11D 1/722*  (2006.01)

(52) U.S. Cl. ............... 524/544; 510/421; 510/422; 510/413; 510/356; 568/622; 568/625

(58) Field of Classification Search ............... 524/544; 510/506, 421; 568/622, 265
See application file for complete search history.

(56) References Cited

U.S. PATENT DOCUMENTS

| 3,704,272 | A |   | 11/1972 | Holmes |
|-----------|---|---|---------|--------|
| 5,376,170 | A | * | 12/1994 | Baker ............... 106/271 |
| 5,707,763 | A | * | 1/1998  | Shimizu et al. ............ 429/217 |
| 6,057,284 | A | * | 5/2000  | Baur et al. ............... 510/506 |
| 6,093,856 | A | * | 7/2000  | Cripe et al. ............... 568/625 |
| 6,498,207 | B1| * | 12/2002 | Hoshikawa et al. ......... 524/378 |

FOREIGN PATENT DOCUMENTS

| EP | 0 481 509 A2 | 4/1992 |
| EP | 0 735 093 A1 | 10/1996 |
| EP | 0 818 506 A1 | 1/1998 |
| EP | 1 059 333 A1 | 12/2000 |
| EP | 1 424 366 A1 | 6/2004 |
| JP | 47-6538 | 4/1972 |
| JP | 8-269285 | 10/1996 |
| JP | 8-269285 A | 10/1996 |
| JP | 11-152385 | 6/1999 |
| JP | 11-152385 A | 6/1999 |
| JP | 11-240993 | 9/1999 |
| JP | 11-240993 A | 9/1999 |
| JP | 2000-198899 | * 7/2000 |
| JP | 2000-198899 A | 7/2000 |
| JP | 2000-511578 | 9/2000 |
| JP | 2003-41126 | 2/2003 |
| JP | 2003-041126 A | 2/2003 |
| WO | WO 97/46311 | 12/1997 |
| WO | WO 03/062291 A1 | 7/2003 |

OTHER PUBLICATIONS

"Modern Fluoropolymers" Edited by John Scheirs, p. 240, 1997.*
"Modern Fluoropolymers", Scheirs, p. 240.*
"Modern Fluoropolymer", Scheir, p. 10.*
International Search Report for PCT/JP03/06177 dated Oct. 7, 2003.

* cited by examiner

*Primary Examiner*—Duane Smith
*Assistant Examiner*—Ives Wu
(74) *Attorney, Agent, or Firm*—Sughrue Mion, PLLC

(57) ABSTRACT

This invention provides the invention provides a fluororesin aqueous dispersion composition comprising a tetrafluoroethylene-based polymer and an aliphatic polyoxyalkylene ether dispersant incorporated therein, wherein the aliphatic polyoxyalkylene ether dispersant shows a 50% decomposition temperature of not lower than 250° C.

10 Claims, No Drawings

FLUORINATED RESIN WATER DISPERSION COMPOSITION AND FLUORINATED WATER BASE COATING COMPOSITION

FIELD OF THE PRESENT INVENTION

The present invention relates to a fluororesin aqueous dispersion composition and to an aqueous fluorine-containing coating composition.

BACKGROUND ART

Fluororesin aqueous dispersion compositions comprise an aqueous dispersion of a fluororesin and further contain one or more additives, such as pigments and fillers, according to the intended use thereof. They are used in providing coated materials obtained through a step of coating such as impregnation coating, dip coating or spray coating and, further, in a large number of application fields such as cast films, plastics additives, fibers, and soil conditioners.

Fluororesin aqueous dispersion compositions comprising tetrafluoroethylene copolymers [TFE copolymers], such as tetrafluoroethylene/perfluoro(alkylvinylether) copolymers [PFAs], and polytetrafluoroethylene [PTFE] have so far been prepared by using alkylphenol-derived nonionic surfactants as dispersants (alkylphenol-based dispersants).

However, since alkylphenols are suspected of endocrine disrupters (environmental hormones), the development of the alkylphenol type dispersants not generating any endocrine disrupters has been awaited.

PTFE-based aqueous dispersions are known in which aliphatic polyoxyalkylene ethers represented by the formula $R^1$-O-$A^1$-H (in which $R^1$ represents a straight or branched or cyclic, saturated or unsaturated aliphatic hydrocarbon group containing 8 to 24 carbon atoms and $A^1$ represents a polyoxyalkylene chain having 2 to 50 oxyethylene groups and 0 to 30 oxypropylene groups) are used as dispersants that will not generate any endocrine disruptors (cf. e.g. Japanese Kokai Publication Sho-47-6538, pages 1-4).

The aliphatic polyoxyalkylene ethers to be used in PTFE-based aqueous dispersions further include those having a cloud point of higher than 45° C. but not higher than 85° C. (e.g. Japanese Kokai Publication Hei-08-269285, pages 1-3), those whose aliphatic hydrocarbon group has one secondary carbon atom in the middle of the principal chain thereof (e.g. Japanese Kokai Publication Hei-11-152385, pages 1-3), those having at least one oxypropylene group per molecule (e.g. Japanese Kokai Publication Hei-11-240993, pages 1-4), and isotridecyl ether-based surfactants comprising an isotridecyl group having at least three branches, together with oxypropylene groups to be used in foam-inhibiting surfactants (e.g. Japanese Kohyo Publication 2000-511578).

As for the process for producing isotridecyl alcohol-derived surfactants, an industrial process generally comprising etherifying oxo alcohols obtained by hydroformylation of olefins containing 12 carbon atoms according to the oxo process is presented in U. Kaluza und K. Taeger: Tenside Surf. Det., vol. 33, paragraph 46 (1996).

The C12 olefins used in this production process are obtained by monomer addition, and the use, as the monomer, of butene(s) alone, propylene alone, or a mixture of butene(s) and propylene is known in the art. According to the examples of Japanese Kohyo Publication 2000-511578, for instance, a mixture of 1-butene and 2-butene is trimerized.

The PTFE-based aqueous dispersions mentioned above are used in the following manner: coated films formed by application thereof to substrates are heated, for baking, to temperatures not lower than the melting point of the fluororesins. However, these PTFE-based aqueous dispersions have problems: they are all poor in film-forming properties and the coat films obtained therefrom are poor in luster.

Those aqueous dispersions prepared by applying such dispersants not generating endocrine disruptors to TFE copolymers such as PFAs or to PTFE species forming a core/shell structure have problems, namely these polymers are highly shrinkable, hence the coating films formed therefrom are readily cracked in the step of baking; further, the film-forming properties of the dispersions and the luster of the coating films formed therefrom are markedly deteriorated.

Among the fluororesin-based coating compositions, there are ones resulting from incorporation of carbon black, graphite or the like as an electrically conductive filler in aqueous dispersion of PTFE or the like so that the coating films obtained may be rendered electrically conductive.

The conductive filler-containing aqueous dispersions have problems, namely they are inferior in coating film leveling and cracking resistance to those not containing conductive filler, their film-forming properties are deteriorated, hence those articles coated therewith cannot be used in those fields of application where tack-freeness and surface smoothness, among others, are required, for example in the field of OA (office automation) equipment and appliances.

A method available for improving the film-forming properties, coating film leveling properties and luster of the fluororesin-based coating compositions in the form of aqueous dispersions comprises adding a film-forming ingredient comprising an acrylic resin or polyoxyethylene-based prepolymer, for instance.

However, the addition of such a film-forming ingredient produces problems in that the composition of the aqueous dispersion becomes complicated and that the film-forming ingredient generates gases in the step of baking of the coatings.

The method comprising adding a film-forming ingredient has a further problem: when at least one of TFE copolymers such as PFAs, PTFE species with a core/shell structure, and conductive fillers is incorporated, either the film-forming properties or the luster of coating films will never be improved.

SUMMARY OF THE PRESENT INVENTION

In view of the above-discussed state of the art, it is an object of the present invention to provide a fluororesin aqueous dispersion composition excellent in film-forming properties and capable of providing coatings with a good luster.

Thus, the invention provides a fluororesin aqueous dispersion composition comprising a tetrafluoroethylene-based polymer and an aliphatic polyoxyalkylene ether dispersant incorporated therein, wherein the aliphatic polyoxyalkylene ether dispersant shows a 50% decomposition temperature of not lower than 250° C.

In another aspect, the invention provides a fluororesin aqueous dispersion composition comprising a fluoropolymer and a polyoxyalkylene isotridecyl ether surfactant, wherein the composition comprises a fluororesin aqueous dispersion, a solid matter in the fluoropolymer accounts for 30 to 70% by mass relative to the total mass of the fluororesin aqueous dispersion, and the polyoxyalkylene isotridecyl ether surfactant accounts for 1 to 21% by mass relative to the mass of the solid matter of the fluoropolymer and is represented by the following general formula (I):

R—O-A-H     (I)

wherein R is an alkyl group represented by —$C_{13}H_{27}$ with an average number of branches of 1.5 to 2.9 per molecule and A represents a polyoxyalkylene chain having 5 to 20 oxyethylene groups and 0 to 6 oxypropylene groups.

The invention further provides a fluorine-containing aqueous coating composition comprising a tetrafluoroethylene-based polymer and an aliphatic polyoxyalkylene ether dispersant incorporated therein, wherein the aliphatic polyoxyalkylene ether dispersant shows a 50% decomposition temperature of not lower than 250° C.

In the following, the present invention is described in detail.

DETAILED DESCRIPTION OF THE PRESENT INVENTION

The "fluororesin aqueous dispersion composition" as referred to herein comprises a fluoropolymer and an aliphatic polyoxyalkylene ether dispersant incorporated therein.

The fluororesin aqueous dispersion composition is a composition comprising a fluororesin aqueous dispersion. The fluororesin aqueous dispersion composition may be the fluororesin aqueous dispersion itself or may be a composition obtained by subjecting the fluororesin aqueous dispersion to a certain treatment. The certain treatment is not particularly restricted but may be such a treatment as addition of one or more additives to be mentioned later herein, followed by adequate stirring or kneading, for instance. The composition obtained by such a certain treatment may be a dispersion or may be in a paste-like form resulting from kneading, for instance.

Therefore, the fluororesin aqueous dispersion composition is generally used as prepared in the form of the above-mentioned fluororesin aqueous dispersion or used after addition, according to the intended use of the composition, of one or more additives to the fluororesin aqueous dispersion prepared.

The fluororesin aqueous dispersion composition can be used, for example, as a coating composition to produce coated materials having a coat film such as a coating film formed thereon by a coating method comprising applying the same to substrates and baking the resulting applied coats, for instance, or as an adhesive.

Generally, the fluoropolymer and fluororesin-based dispersing agent, when made to be contained in the fluororesin aqueous dispersion, become contained in the fluororesin aqueous dispersion composition. Therefore, the aliphatic polyoxyalkylene ether dispersant is only required to produce its effects on the dispersibility, mechanical stability and storage stability, among others, of the fluoropolymer at least in the fluororesin aqueous dispersion, unless otherwise described, even when mention is made herein of the fluororesin aqueous dispersion composition for convenience sake.

The above-mentioned fluororesin aqueous dispersion is an aqueous dispersion of a fluororesin. The fluororesin comprises a fluoropolymer.

The fluororesin aqueous dispersion is an aqueous dispersion with particles comprising fluoropolymers as the dispersoid and an aqueous medium as the dispersion medium.

The aliphatic polyoxyalkylene ether dispersant mentioned above forms micelles in the above-mentioned aqueous medium, and the above-mentioned fluoropolymer is incorporated in those micelles and thus dispersed in the aqueous medium as oil-in-water type particles thereof. The "fluoropolymer" is a polymer having carbon atom-bound fluorine atoms and includes tetrafluoroethylene-based polymers [TFE-based polymers], as mentioned later herein.

In the present specification, a fluororesin aqueous dispersion composition comprising a tetrafluoroethylene-based polymer and an aliphatic polyoxyalkylene ether dispersant incorporated therein and showing a 50% decomposition temperature of not lower than 250° C. is hereinafter referred to as "fluororesin aqueous dispersion composition (1)" according to the invention. When merely referred to herein as "fluororesin aqueous dispersion composition" without adding the above-mentioned numeral "(1)" or the numeral "(2)" to be described later herein, the aqueous dispersion composition is a fluororesin aqueous dispersion composition comprising the above-mentioned fluororesin and an aliphatic polyoxyalkylene ether dispersant incorporated therein and may include, within the meaning thereof, a fluororesin aqueous dispersion composition (1) and a fluororesin aqueous dispersion composition (2).

The fluororesin aqueous dispersion composition (1) according to the invention comprises the aliphatic polyoxyalkylene ether dispersant showing a 50% decomposition temperature of not lower than 250° C., so that it is excellent in film-forming properties and can give coat films with good luster.

The "50% decomposition temperature" so referred to herein is the temperature at which a sample collected at room temperature, when heated at a rate of 10° C./minute under an air stream at a flow rate of 200 ml/minute using a differential scanning thermogravimetric analyzer [DTGA], shows a loss of 50% in mass of the sample after temperature raising versus the mass of the sample before heating as measured with a thermobalance.

When its 50% decomposition temperature is below 250° C., the above-mentioned aliphatic polyoxyalkylene ether dispersant will be decomposed until melting of the TFE-based polymer in the step of baking the applied coats formed from the fluororesin aqueous dispersion composition, hence will fail to remain or will remain only in slight amounts in the coatings. As a result, the aliphatic polyoxyalkylene ether dispersant previously occurring so as to fill up spaces among TFE-based polymer particles at the time of applying will be lost, leaving a state such that the TFE-based polymer particles remain in a discontinuous manner on the substrate surface. In such applied coats, the TFE-based polymer particles with a particle diameter of 0.1 to 0.3 μm will be converted to a powder state, resulting in a decrease in apparent density. When melted, the TFE-based polymer particles generally hold together to form a film as a result of their own surface tension. In the case of applied coats low in apparent density, however, the TFE-based polymer particles, even when individually melted, will not be fused together to a sufficient extent, so that poor film-forming properties, namely poor leveling, poor luster and tendency toward cracking, will result.

When the 50% decomposition temperature of the aliphatic polyoxyalkylene ether dispersant is not lower than 250° C., at least part of the dispersant will not be decomposed in the step of baking the applied coats formed from the resulting fluororesin aqueous dispersion composition (1) but can remain in the applied coats and still serve to fill up spaces among TFE-based polymer particles to thereby join the TFE-based polymer particles together and promote the mutual fusion of the TFE-based polymer particles. Therefore, the fluororesin aqueous dispersion composition (1) of the present invention is excellent in film-forming properties, inclusive of cracking resistance, and can provide coat films with good luster owing to its improved leveling property even when any film-forming ingredient comprising an acrylic resin, a polyoxyethylene-based prepolymer or the like is not used.

The upper limit to the 50% decomposition temperature of the aliphatic polyoxyalkylene ether dispersant is preferably 350° C. When the 50% decomposition temperature exceeds 350° C., most of the dispersant will remain undecomposed in the applied coats formed by application of the resulting fluororesin aqueous dispersion composition in the step of baking of the applied coats, possibly leading to discoloration of the coat films.

A preferred lower limit to the 50% decomposition temperature of the aliphatic polyoxyalkylene ether dispersant is 260° C., and a more preferred upper limit thereto is 330° C., still more preferably 320° C.

The aliphatic polyoxyalkylene ether dispersant is preferably one represented by the following general formula:

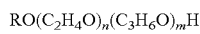

$RO(C_2H_4O)_n(C_3H_6O)_mH$ wherein R represents a straight or branched, saturated or unsaturated acyclic aliphatic hydrocarbon group containing 8 to 18 carbon atoms or a saturated alicyclic aliphatic hydrocarbon group containing 8 to 18 carbon atoms, n represents an integer of 3 to 25 and m represents an integer of 0 to 6.

In the present specification, the number of carbon atoms contained in R, the value of n and the value of m in the above general formula each is the mean of the values for respective molecules of the aliphatic polyoxyalkylene ether dispersant.

The fluororesin aqueous dispersion composition (1) of the present invention contains an aliphatic polyoxyalkylene ether dispersant used in lieu of the alkylphenol-based dispersants so far used, and this aliphatic polyoxyalkylene ether dispersant is an alkyl ether type dispersant and therefore shows no endocrine disrupting effects and exercises only slight influence on the biological environment.

The acyclic aliphatic hydrocarbon group mentioned above is an aliphatic hydrocarbon group having no cyclic structure. The above-mentioned saturated alicyclic hydrocarbon group is an aliphatic hydrocarbon group having a saturated cyclic structure. The above-mentioned saturated alicyclic hydrocarbon group, when it contains 8 to 18 carbon atoms in total, may have two or more saturated cyclic structures. So long as the saturated alicyclic hydrocarbon group substituent contains 8-18 carbon atoms in total, inclusive of the carbon atom(s) in the substituent(s), if any, one or two or more hydrogen atoms bound to the saturated cyclic structure each may be substituted by a straight or branched alkyl group.

From the viewpoint of good adsorbability onto TFE-based polymer particles, the group R in the above aliphatic polyoxyalkylene ether dispersant is preferably a branched one. Generally, the thermal decomposition temperature lowers as the number of branches in the group R increases. Therefore, the dispersant is more preferably one in which the group R is branched to such an extent that the 50% decomposition temperature is still 250° C. or above. From the viewpoint of ready availability, among others, those in which the group R is a branched, saturated acyclic aliphatic hydrocarbon group are still more preferred. As is evident from the method of production described later herein, the aliphatic polyoxyalkylene ether dispersant is generally obtained as the reaction product of the addition reaction of a monomer or monomers, hence as a set of molecules capable of individually differing in the state of branching of the group R according to the orientation of addition.

From the viewpoint of good dispersibility of TFE-based polymer particles, a preferred upper limit to the group R is 16, a more preferred upper limit is 13, and a preferred lower limit is 10. More preferably, the group R contains 13 carbon atoms.

The above group R is still more preferably a saturated, acyclic, aliphatic hydrocarbon group containing 13 carbon atoms, namely a group represented by the formula —$C_{13}H_{27}$, most preferably a branched, saturated, acyclic aliphatic hydrocarbon group containing 13 carbon atoms. As such, there may be mentioned isotridecyl groups, for instance.

Generally, the hydrophilicity of the aliphatic polyoxyalkylene ether dispersant increases as the length of the polyoxyalkylene chain represented by —$(C_2H_4O)_n(C_3H_6O)_m$— in the above general formula increases, and the hydrophobicity increases as the chain length decreases. If the hydrophilicity of the aliphatic polyoxyalkylene ether dispersant is excessively high, the resulting fluororesin aqueous dispersion composition (1), when used for forming coat films by repeatedly applying the same, for example in the manner of re-coat, may allow cissing to occur, whereby the film-forming properties thereof will be deteriorated in certain instances. If the hydrophobicity is excessively high, the resulting fluororesin aqueous dispersion composition (1) will have a high viscosity, hence such coat films as mentioned above will not become even; thus, the film-forming properties and/or luster may possibly be deteriorated.

The symbol n in the above general formula represents an integer of 3 to 25, and the symbol m represents an integer of 0 to 6. When m exceeds 6, the solubility of the aliphatic polyoxyalkylene ether dispersant decreases and the dispersibilities of the resulting fluororesin aqueous dispersion composition are thereby deteriorated, hence the coat films will not become uniform; thus, the film-forming properties and/or luster may possibly be deteriorated. From the solubility viewpoint, the number m is preferably as small as possible. A preferred upper limit thereto is 5, and a more preferred upper limit is 3. Most preferably, the number m is 0 (zero). Thus, no oxypropylene group may be present.

The upper limit to the number n is preferably 5, more preferably 8, and the upper limit to n is preferably 20, more preferably 12, although each limit may vary depending on the number of carbon atoms contained in the group R.

The above-mentioned polyoxyalkylene chain is preferably one in which n is 5 to 20 and m is 0 to 5, more preferably one in which n is 8 to 12 and m is 0 to 3, still more preferably one in which n is 8 to 12 and m is 0.

Polyoxyalkylene isotridecyl ether-based surfactants, for instance, are preferred as the above-mentioned aliphatic polyoxyalkylene ether dispersant.

The hydrophilicity-hydrophobicity balance of the aliphatic polyoxyalkylene ether dispersant can be expressed in terms of HLB, cloud point, surface tension and so forth, like in the case of surfactants in general. The HLB has an effect on the viscosity of the fluororesin aqueous dispersion composition (1) of the present invention and, therefore, it is to be adequately selected according to the coating method and conditions to be employed.

The aliphatic polyoxyalkylene ether dispersant preferably has an HLB value of 8 to 14. When the HLB is within the above range, the dispersant can be properly used as the dispersant in the fluororesin aqueous dispersion composition (1) of the present invention. The higher the hydrophilicity is, the greater the value of HLB, and the higher the hydrophobicity is, the lower the value is. When its HLB is lower than 8, the aliphatic polyoxyalkylene ether dispersant produces a marked thickening effect and, when its HLB exceeds 14, it can be used as a dispersion stabilizer. A more preferred lower limit to the HLB is 9 and a more preferred upper limit is 13.

The "HLB" so referred to herein means the value estimated by Griffin's method of calculation.

The aliphatic polyoxyalkylene ether dispersant may comprise one single species or two or more species.

In the practice of the present invention, the aliphatic polyoxyalkylene ether dispersant preferably shows an oxidative degradation rate of not higher than 2% at 200° C.

The "oxidative degradation rate" so referred to herein means the difference [($d_{Air}-d_{N2}$) %] between the percent loss in mass [$d_{N2}$] for a sample collected at room temperature after raising temperature at a rate of 10° C./minute under a nitrogen stream at a flow rate of 200 ml/minute using a differential scanning thermogravimetric analyzer [DTGA] (mass measurements being made with a thermobalance) as compared with the sample before temperature raising and the loss in mass [$d_{Air}$] as found by passing air in lieu of nitrogen under the same conditions as mentioned above. Thus, "an oxidative degradation rate of not higher than 2% at 200° C." herein means that the sample heated from room temperature to 200° C. under the above measurement conditions shows a loss in mass of not greater than 2% as compared with the sample before starting temperature raising.

Oxidative degradation of aliphatic polyoxyalkylene ether dispersants gives aldehydes, such as acetaldehyde, and these aldehydes, including isobutyraldehyde as a typical example which is designated as a specified malodorous substance by the relevant law, are generally odorous substances. The higher the above-defined oxidative degradation rate is, the more the odor emission from aliphatic polyoxyalkylene ether dispersants is. On the other hand, the lower the above oxidative degradation rate is, the slighter the odor emission is. Odor emission at low temperatures, in particular, is difficult to cope with from the working environment viewpoint, hence the dispersant is desired to be low in oxidative degradation at low temperatures. If its oxidative degradation rate at 200° C. is not higher than 2%, the aliphatic polyoxyalkylene ether dispersant, when used in the fluororesin aqueous dispersion composition (1) of the present invention, will emit odor only to a slight extent in the step of drying or baking in the process of processing using the same, hence scarcely causes troubles in the working environment.

In the practice of the present invention, the aliphatic polyoxyalkylene ether dispersant more preferably shows a 50% decomposition temperature of not lower than 250° C. and an oxidative degradation rate of not higher than 2% at 200° C. and, still more preferably, it shows a 50% decomposition temperature of not lower than 250° C. and an oxidative degradation rate of not higher than 2% at 200° C. and is an aliphatic polyoxyalkylene ether compound represented by the above general formula, namely $RO(C_2H_4O)_n(C_3H_6O)_mH$.

Aliphatic polyoxyalkylene ether dispersants generally tend to show an increased oxidative degradation rate, for example, when the number of branches in the aliphatic hydrocarbon group such as the group R in the above general formula is small and the number of oxyalkylene groups added is large. When the aliphatic hydrocarbon group such as the group R in the above general formula is a branched acyclic aliphatic hydrocarbon group, for instance, the oxidative degradation rate at 200° C. tends to become not higher than 2% and, when R in the above general formula is an alkyl group represented by the formula $C_{13}H_{27}$ with a branching degree of 1.5 to 2.9 branches per molecule, the oxidative degradation rate at 200° C. is generally not higher than 2%.

The method of producing the above-mentioned aliphatic polyoxyalkylene ether dispersant is not particularly restricted but may be any of the conventional methods. For example, there may be mentioned the method comprising etherifying oxo alcohols obtained by hydroformylation from olefins containing 12 carbon atoms in the oxo process. The olefins containing 12 carbon atoms can be obtained by addition of such a monomer as butene alone, propylene alone, or a butene-propylene mixture.

The aliphatic polyoxyalkylene ether dispersant is preferably used in an amount of 1 to 21% by mass, more preferably 2 to 20% by mass based on the mass of the main solid matter. The "main solid matter" so referred to herein includes, within the meaning thereof, the solid matter in the TFE-based polymer in the fluororesin aqueous dispersion composition and the conductive filler used when desired.

When the aliphatic polyoxyalkylene ether dispersant is used in an amount smaller than 1% by mass based on the mass of the main solid matter, the resulting fluororesin aqueous dispersion composition (1) will be poor in dispersion stability and in leveling properties. When it is used in an amount exceeding 21% by mass, the decomposition gas generation from the aliphatic polyoxyalkylene ether dispersant will increase, leading to the formation of minute bubbles, hence to deterioration in film-forming properties or luster, and the coat films will be readily discolored in the step of baking applied coats of the resulting fluororesin aqueous dispersion composition (1). A more preferred upper limit is 15% by mass, although such limit may depend on the level of oil absorption by the conductive filler and pigments to be incorporated where desired, among others.

When the aliphatic polyoxyalkylene ether dispersant to be used comprises at least one species showing a 50% decomposition temperature of not lower than 250° C., it may be a mixture with one or two species showing a 50% decomposition temperature of lower than 250° C. In such mixture, the aliphatic polyoxyalkylene ether dispersant showing not lower than 250° C. in 50% decomposition temperature is incorporated in an amount corresponding to the above-mentioned level of addition relative to the mass of the main solid matter and preferably accounts for at least 40% by mass of the mixture. When that proportion is lower than 40% by mass, the TFE-based polymer particles will fail to be fused together to a satisfactory extent in the step of baking applied coats of the fluororesin aqueous dispersion composition (1). A more preferred lower limit is 50% by mass. The aliphatic polyoxyalkylene ether dispersant preferably comprises one or more species showing a 50% decomposition temperature of not lower than 250° C. alone since, then, the fluororesin aqueous dispersion composition (1) will show good film-forming properties and the coat films obtained will be excellent in luster.

The fluororesin aqueous dispersion composition (1) of the present invention comprises the above-mentioned aliphatic polyoxyalkylene ether dispersant incorporated therein together with a tetrafluoroethylene-based polymer [TFE-based polymer].

The TFE-based polymer is not particularly restricted but includes, among others, tetrafluoroethylene homopolymers [TFE homopolymers], and modified polytetrafluoroethylene species [modified PTFEs].

The term "modified PTFE" as used herein means the product of copolymerization of tetrafluoroethylene [TFE] with such a small proportion of a comonomer(s) other than TFE that it may not be provided with melt processability.

The comonomer in a small proportion to be used is not particularly restricted but includes, among others, fluoroalkylvinylethers, such as perfluoro(alkylvinylether) [PAVE] species, hexafluoropropylene [HFP], chlorotrifluoroethylene [CTFE], perfluoro(alkoxyvinyl ether) species, trifluoroethylene, and perfluoro(alkylethylene) species.

The proportion of the comonomer(s) in a small proportion may vary according to the species thereof. Generally, however, it is preferably 0.001 to 1% by mass, more preferably 0.01 to 1% by mass, based on the total mass of TFE and the comonomer(s) in a small amount, when a PAVE or a perfluoro (alkoxyvinyl ether) is used, for instance.

From the processability viewpoint, the modified PTFE includes copolymers of tetrafluoroethylene and a fluoroalkylvinylether(s), the proportion of the fluoroalkylvinylether(s) preferably being 0.001 to 1.0% by mass, more preferably 0.01 to 0.5% by mass, based on the total mass of tetrafluoroethylene and the fluoroalkylvinylether(s).

The above-mentioned TFE homopolymer and/or modified PTFE may be one forming a core/shell structure comprising a core and a shell. The TFE homopolymer and/or modified PTFE forming such a core/shell structure is not particularly restricted but includes, among others, those in which either one of the core and shell comprises a modified PTFE and the other comprises a TFE homopolymer, and those in which the core and shell each comprises a modified PTFE.

Hereinafter in this specification, the modified PTFE forming the core of a core/shell structure is sometimes referred to as "modified PTFE (A)", and the modified PTFE forming the shell of a core/shell structure as "modified PTFE (B)". In cases where the core and shell of the above-mentioned core/shell structure each comprises a modified PTFE, the modified PTFE (A) and the modified PTFE (B) differ in the comonomer species other than TFE as used in a small amount and/or in monomer ratio.

When the TFE-based polymer is a TFE homopolymer and/or a modified PTFE, it may be one forming a core/shell structure comprising a core comprising a modified PTFE (A) or a TFE homopolymer and a shell comprising a modified PTFE (B). Such a core/shell structure is preferred since the fibrillation to be encountered in case of using a TFE homopolymer singly can be prevented and the coat films obtained can be improved in corrosion resistance.

Those aqueous dispersion compositions known in the art which have a core/shell-structured TFE homopolymer and/or modified PTFE have such advantageous features as mentioned above but also have problems, namely the coat films obtained therefrom readily undergo cracking and are poor in luster. These problems are presumably caused by the fact that the particles less tend to get entangled with one another and hardly tend to fused together as compared with the particles of a TFE homopolymer used singly, which readily undergo fibrillation.

On the contrary, in the case of the fluororesin aqueous dispersion composition (1) of the present invention, at least part of the aliphatic polyoxyalkylene ether dispersant showing such a 50% decomposition temperature as mentioned above remains undecomposed until complete melting of the particles of the core/shell-structured TFE homopolymer and/or modified PTFE in the step of baking of applied coats, so that the particles can be thoroughly fused together, showing good film-forming properties and providing the coat films with luster.

The TFE-based polymer, when it comprises a TFE homopolymer and/or a modified PTFE, preferably has a number average molecular weight of not lower than 4,000,000. When the number average molecular weight is lower than 4,000,000, the resulting coat films may be low in wear resistance and unsatisfactory in durability in some instances. A preferred lower limit is 5,000,000. Within the above range, the number average molecular weight of the TFE homopolymer and/or modified PTFE is preferably not higher than 8,000,000 since, then, the dispersibility of the fluororesin aqueous dispersion composition (1) will not be deteriorated.

The term "number average molecular weight [Mn]" as used herein refers to the value calculated as follows:

$$[\text{Standard specific gravity (SSG)}] = -0.0579 \times \log Mn + 2.6113.$$

The above-mentioned TFE-based polymer may comprise the above-mentioned TFE homopolymer and/or modified PTFE or a tetrafluoroethylene copolymer [TFE copolymer]. The term "TFE copolymer" as used herein means the product of copolymerization of TFE and one or more comonomers other than TFE which copolymer is melt-processable. The TFE copolymer is common to the above-mentioned modified PTFE in that it is the product of copolymerization of TFE and another comonomer or other comonomers; it differs, however, from the above-mentioned modified PTFE lacking in melt processability in that it has melt processability. The TFE copolymer has melt processability and, therefore, the proportion of the other comonomer(s) incorporated in the TFE copolymer is generally higher than the proportion of the small amount of the comonomer(s) incorporated in the modified PTFE and, generally, that proportion preferably exceeds 1% by mass based on the total mass of TFE and the other comonomer(s).

Among the fluororesin aqueous dispersion compositions (1) of the present invention, those in which the TFE-based polymer is a TFE copolymer are sometimes referred to herein as "TFE copolymer-based aqueous dispersion compositions".

The other comonomer mentioned above is not particularly restricted but includes, among others, vinyl monomers such as trifluoroethylene, CTFE, HFP, PAVEs, ethylene and propylene. The proportion of the other comonomer(s) incorporated in the TFE copolymer may vary depending on the species thereof. When a PAVE is used as the other comonomer, for instance, the proportion thereof is generally 2.0 to 6.0% by mass based on the total mass of TFE and the other comonomer.

The TFE copolymer is not particularly restricted but includes, among others, TFE/HFP copolymers [FEPs], TFE/PAVE copolymers [PFAs], ethylene/TFE copolymers, and propylene/TFE copolymers. The TFE copolymer may be the product of copolymerization of TFE and such a comonomer(s) as mentioned above, further together with a monomer having such a functional group as hydroxyl or carboxyl and/or a cyclic structure as used in a small proportion such that the properties intrinsic in the TFE copolymer, for example heat resistance, will not be sacrificed.

The TFE copolymer preferably has a melting point of not lower than 200° C. When the melting point is not lower than 200° C., the coat films obtained from the fluororesin aqueous dispersion composition (1) will be excellent in mechanical strength and heat resistance, among others. A more preferred lower limit to the melting point of the TFE copolymer is 250° C. The melting point of the TFE copolymer is within the above range, as mentioned hereinabove referring to PFAs and FEPS, and is generally not higher than 310° C.

The number average molecular weight of the TFE copolymer is preferably 400,000 to 1,000,000. When it is less than 400,000, the coat films obtained from the fluororesin aqueous dispersion composition (1) may be low in wear resistance and unsatisfactory in durability in certain instances. When it is above 1,000,000, the good leveling properties and luster which the molten resin has may possibly deteriorate.

In the case of coating compositions, for instance, the conventional coating compositions in which the above-mentioned TFE copolymer is used have problems in that the coating films obtained are readily susceptible to cracking and poor in luster as compared with the conventional coating compositions in which a TFE homopolymer and/or modified PTFE is used. Presumably, these problems are caused by the fact that the thermal shrinkage of the applied coats is great between the step of melting during baking after application and the succeeding step of cooling.

When the above-mentioned TFE copolymer-based aqueous dispersion composition is used, the aliphatic polyoxyalkylene ether dispersant showing a 50% degradation temperature of not lower than 250° C. at least partly remains undecomposed in the step of baking of the applied coats until melting of the particles of the TFE copolymer to promote mutual fusion of the particles of the TFE copolymer, whereby the occurrence of cracking is prevented and the coat films can be provided with luster.

The TFE copolymer may be a perfluorocopolymer.

The perfluorocopolymer includes those TFE copolymers in which the other comonomer(s) than TFE is(are) a perfluorocomonomer(s). Thus, the perfluorocopolymer is the product of copolymerization of TFE and one or more perfluorocomonomers other than TFE and has melt processability. The term "perfluorocomonomer" as used herein means a vinyl monomer whose trunk chain is composed of carbon atoms and fluorine atoms alone or of carbon atoms, fluorine atoms and an oxygen atom or atoms alone and has no hydrogen atom therein.

Among the TFE copolymer-based aqueous dispersion compositions, those in which the TFE copolymer is a perfluorocopolymer are sometimes referred to herein as "perfluorocopolymer-based aqueous dispersion compositions".

The perfluorocomonomer is not particularly restricted but includes, among others, HFP and PAVEs.

The perfluorocopolymer is not particularly restricted but includes, among others, FEP and PFAs.

The perfluorocopolymer-based aqueous dispersion composition can be suitably used in those fields in which nonstickiness and corrosion resistance are required, since the perfluorocopolymer is excellent in nonstickiness and corrosion resistance, in particular.

The TFE-based polymer in the fluororesin aqueous dispersion composition (1) may comprise a TFE homopolymer alone or a modified PTFE alone, or a TFE copolymer alone, for example a perfluorocopolymer alone, or a mixture of a TFE homopolymer and/or modified PTFE and a TFE copolymer. In the case of such a mixture, the TFE homopolymer and/or modified PTFE may have such a core/shell structure as mentioned above. The TFE copolymer in the above mixture may be a perfluorocopolymer.

In the case of coating compositions, for instance, the conventional coating compositions in which the TFE-based polymer is a core/shell-structured TFE homopolymer and/or modified PTFE or a TFE copolymer such as a perfluorocopolymer have problems in that the coating films obtained are susceptible to cracking and cannot be given luster. On the contrary, the fluororesin aqueous dispersion composition (1) of the present invention, which comprises the above-mentioned aliphatic polyoxyalkylene ether dispersant incorporated therein, can allow the core/shell-structured particles of the TFE homopolymer and/or modified PTFE or the TFE copolymer particles to fuse together to a satisfactory extent, hence is excellent in film-forming properties and can provide the resulting coat films with luster.

The TFE-based polymer to be used in the fluororesin aqueous dispersion composition (1) of the present invention can be obtained by such a known polymerization technique as suspension polymerization, emulsion polymerization, bulk polymerization or solution polymerization. Preferred as the method of polymerization are, however, suspension polymerization and emulsion polymerization in view of the frequent industrial use thereof, among others. Emulsion polymerization is more preferred from the viewpoint that the polymerization reaction mixture after completion of the reaction can be used as such in preparing the fluororesin aqueous dispersion composition (1).

The emulsifier to be used in preparing the TFE-based polymer by emulsion polymerization is not particularly restricted but includes, among others, compounds represented by the general formula:

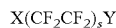

$$X(CF_2CF_2)_sY$$

wherein X represents a hydrogen or fluorine atom, Y represents —COONH$_4$, —COONa, —COOK, —SO$_3$Na or —SO$_3$K and s represents an integer of 1 to 7.

The polymerization initiator is not particularly restricted but includes, among others, persulfates such as ammonium persulfate and potassium persulfate; and water-soluble peroxides such as diacyl peroxides.

The aqueous dispersion of the TFE-based polymer as obtained by emulsion polymerization can be used in preparing the fluororesin aqueous dispersion composition (1) of the present invention by concentrating the dispersion using the aliphatic polyoxyalkylene ether dispersant mentioned above.

The fluororesin aqueous dispersion composition (1) is preferably prepared so that the TFE-based polymer solid matter may amount to 10 to 70% by mass based on the total mass of the composition. A more preferred lower limit is 30% by mass, while a more preferred upper limit is 65% by mass.

The term "solid matter" as used herein means that matter which is solid at 30° C. When the TFE-based polymer occurs as an aqueous dispersion, the solid matter of the TFE-based polymer is the whole amount of the TFE-based polymer particles occurring in the aqueous dispersion as a dispersoid or the like.

The "total mass of the fluororesin aqueous dispersion composition (1)" so referred to above is the sum of the masses of the solid matter and liquid matter constituting the fluororesin aqueous dispersion composition (1). The solid matter constituting the fluororesin aqueous dispersion composition (1) includes the TFE-based polymer particles, among others, and the liquid matter constituting the fluororesin aqueous dispersion composition (1) includes water or the like dispersion medium and an additive dissolved in this dispersion medium, among others.

When the solid matter in the TFE-based polymer amounts to a level not lower than 10% by mass based on the total mass of the fluororesin aqueous dispersion composition (1), the fluororesin aqueous dispersion composition (1) obtained can be used in thin film coating by dipping. When the solid matter content is 30% by mass or higher, the coverage amount of the composition per dipping in the step of dip coating increases, hence efficient heavy coating is possible to perform. At the content exceeding 70% by mass, the dispersibility of the fluororesin aqueous dispersion composition (1) obtained will decrease, the coat film will become uneven, and the film forming properties and luster will possibly become poor. A more preferred lower limit is 35% by mass, and a more preferred upper limit is 65% by mass.

The fluororesin aqueous dispersion composition (1) of the present invention may be one comprising the TFE-based polymer and the aliphatic polyoxyalkylene ether dispersant as incorporated therein and, further a thickening agent as incorporated therein.

The thickening agent is not particularly restricted but may include any of those which can increase the viscosity of the fluororesin aqueous dispersion composition (1), including, among others, methylcellulose, polyvinyl alcohol, and polyacrylic acid copolymers.

The fluororesin aqueous dispersion composition (1) of the present invention may be one comprising the TFE-based polymer and the aliphatic polyoxyalkylene ether dispersant as incorporated therein and, further a thickening agent and/or a conductive filler as incorporated therein according to the intended use of the composition.

Among the fluororesin aqueous dispersion compositions (1) of the present invention, those which contain a conductive filler as incorporated therein are sometimes referred to herein as "conductive filler-containing aqueous dispersion compositions". Thus, the conductive filler-containing aqueous dispersion composition of the present invention comprises at least the TFE-based polymer, the aliphatic polyoxyalkylene ether dispersant and, further, a conductive filler incorporated therein.

Generally, conductive fillers tend to be oriented in three-dimensional directions and are large in structure. The coat films obtained from conductive filler-containing aqueous dispersion composition show a decreased surface resistivity because of mutual contacting of the conductive filler particles in the coat films.

The conductive filler-containing aqueous dispersion composition preferably has a surface resistivity of not higher than $10^{10} \Omega/\square$ since the coat films obtained can then have an adequate level of electric conductivity for the intended use thereof.

The conductive filler is preferably used in an amount of 0.1 to 15% by volume based on the volume of the main solid matter, which is the sum of the solid matter in the TFE-based polymer and conductive filler in the fluororesin aqueous dispersion composition mentioned above.

The "% by volume" of the main solid matter, so referred to herein, is the value calculated according to the following formula:

[% by volume]={(1.8×p)/[(1.8×p)+(2.2×q)]}×100 where p is the mass [kg] of the conductive filler and q is the mass [kg] of the solid matter in the TFE-based polymer.

When the level of addition of the conductive filler is lower than 0.1% by volume, the coat films obtained may not have a surface resistivity of not higher than $10^{10} \Omega/\square$ in some instances and, when it is above 15% by volume, the coat films obtained may be poor in physical properties, for example in film-forming properties, luster and nonstickiness. A more preferred lower limit is 0.5% by volume, and a still more preferred lower limit is 0.8% by volume, while a more preferred upper limit is 12% by volume, and a still more preferred upper limit is 11% by volume. While the conductive filler tends to be oriented in three-dimensional directions and is large in structure, the surface resistivity of coatings can be rendered not higher than $10^{10} \Omega/\square$ by employing such a low addition level as mentioned above.

The conductive filler is not particularly restricted but includes, among others, metallic conductive fillers such as silver, copper, nickel and aluminum; conductive carbon fillers such as graphite species and carbon black species; and composite conductive fillers such as those obtainable by coating metallic conductive fillers or conductive carbon fillers with mica, whiskers or the like. The carbon black species are not particularly restricted but include, among others, Ketjenblack, furnace black, acetylene black, and lamp black.

Conductive carbon fillers, which are low in specific gravity and are required to be used only at low weight addition levels, are preferred as the conductive filler. Among them, Ketjen black is more preferred since the required weight addition level is lower.

Morphologically, the conductive filler is not particularly restricted but may be spherical, flake-like, or fibrous, for instance.

The conductive filler preferably has an average particle size of 0.01 to 20 μm. When the average particle size is smaller than 0.01 μm, the coat films obtained may have an increased surface resistivity in some instances and, when the average particle size is larger than 20 μm, the film-forming properties, leveling properties, nonstickiness, surface smoothness and other physical properties of the coat films may become deteriorated.

The TFE polymer-based aqueous dispersions containing conductive fillers, known in the art, have problems in that the coat films formed therefrom are poor in leveling properties, surface smoothness and luster and are susceptible to cracking and that the dispersions are also poor in film-forming properties. These problems are presumably produced by the fact the dispersant is mostly decomposed until melting of the TFE-based polymer in the step of baking of applied coats and the apparent density of the applied coats decreases and that the conductive filler physically inhibits the film formation by the TFE-based polymer to a considerable extent. Those sites where the mutual fusion of TFE-based polymer particles is incomplete presumably serve as originating sites of cracks.

The aliphatic polyoxyalkylene ether dispersant in the conductive filler-containing aqueous dispersion composition of the present invention remains in the applied coats formed from that composition until complete melting of the TFE-based polymer in the step of baking of the applied coats, as described hereinabove and thus causing mutual contact of the TFE-based polymer particles and promoting mutual fusion of the TFE-based polymer particles. Therefore, the conductive filler-containing aqueous dispersion composition is excellent in film-forming properties, inclusive of cracking resistance, and leveling properties and can improve the surface smoothness and luster of coat films, without using any of film-forming ingredients comprising acrylic resins, polyoxyethylene prepolymers, etc.

The fluororesin aqueous dispersion composition (1) of the present invention may be one comprising the TFE-based polymer and the aliphatic polyoxyalkylene ether dispersant as incorporated therein and, where desired, a thickening agent and/or a conductive filler and, further, an additive(s) selected from among pigments, antifoaming agents, drying rate modifiers and the like as incorporated according to the method of application and the intended use of the composition, for instance. The pigment is not particularly restricted but includes, among others, carbon, titanium oxide, red iron oxide, mica, cobalt oxide, and chromium oxide.

When it is the fluororesin aqueous dispersion itself or a dispersion derived from the fluororesin aqueous dispersion by some treatment, the fluororesin aqueous dispersion composition (1) of the present invention contains an aqueous medium together with the TFE-based polymer and aliphatic polyoxyalkylene ether dispersant. The aqueous medium is not particularly restricted but may be any of water-containing ones, including mixtures of water and a water-soluble organic solvent, and water, for instance. Preferably, it does not contain any water-soluble organic solvent. The aqueous medium may contain the above-mentioned thickening agent and one or more of the additives to be mentioned later herein as dissolved therein. The aqueous medium may be either the aqueous medium itself used in polymerization for the TFE-based polymer by polymerization reaction or one prepared separately from the aqueous medium for polymerization. The aqueous medium used in polymerization for the TFE-based polymer by polymerization can be used as such.

The fluororesin aqueous dispersion composition (1) of the present invention can be prepared in the conventional manner. When the TFE-based polymer is produced by emulsion polymerization, the above-mentioned method of preparation preferably comprises the following steps:

(1) Carrying out the polymerization in an aqueous dispersion medium to give a TFE-based polymer-containing aqueous dispersion with a TFE-based polymer solid matter concentration of 20 to 40% by mass;
(2) Concentrating the above TFE-based polymer-containing aqueous dispersion;
(3) Adding the dispersant after concentration and adjusting the TFE-based polymer solid matter concentration; and
(4) Incorporating, after solid matter concentration adjustment, a thickening agent, a conductive filler, and/or a further additive as desired.

In the above step (2), the TFE-based polymer-containing aqueous dispersion is generally concentrated at a temperature within the range of 30 to 90° C. until a TFE-based polymer solid matter concentration of 50 to 75% by mass, preferably 60 to 70% by mass. The method of concentration which can be used includes the conventional methods such as phase separation, concentration by evaporation as described in U.S. Pat. No. 3,316,201, electric decantation as described in British Patent No. 642,025, and membrane separation using an ultrafiltration membrane, as described in Japanese Kokai Publication Hei-02-34971 or U.S. Pat. No. 436,926. In the case of phase separation, the concentrating agent to be used is not particularly restricted but the above-mentioned aliphatic polyoxyalkylene ether dispersant can be used and, in this respect, the phase separation method is preferred as the method of concentration. From the dispersion stability viewpoint, the aliphatic polyoxyalkylene ether dispersant to be used in the above-mentioned phase separation is preferably the same as the dispersant to be used in the above step (3).

The above-mentioned aliphatic polyoxyalkylene ether dispersant is used as the dispersant in the above step (3). After addition of the dispersant, the TFE-based polymer is preferably adjusted to a solid matter concentration within the range of 10 to 70% by mass according to intented use. A more preferred lower limit is 30% by mass, and a more preferred upper limit is 65% by mass. In the step (3), the pH may be adjusted by using a pH adjusting agent, if desired.

In adding a thickening agent, a conductive filler, an additive(s) and/or the like in the step (4), the conductive fillers and pigments can be respectively dispersion-stabilized in advance by using the above-mentioned aliphatic polyoxyalkylene ether dispersant and then incorporated into the fluororesin aqueous dispersion.

The fluororesin aqueous dispersion composition (1) of the present invention is preferably one whose cracking limit film thickness, which is to be described later herein, is above 20 µm. When that thickness is less than 20 µm, coating becomes difficult to perform and coat film defects tend to appear readily.

In the case of coating compositions, for instance, which comprise the above-mentioned core/shell-structured TFE homopolymer and/or modified PTFE as well as the above-mentioned TFE copolymer such as a perfluorocopolymer, the conventional coating compositions have problems in that the coating films obtained are readily susceptible to cracking and the film-forming properties and/or luster may be inferior, whereas the fluororesin aqueous dispersion composition (1) of the present invention comprises the above-mentioned aliphatic polyoxyalkylene ether dispersant with a 50% degradation temperature of not lower than 250° C. as incorporated therein and, therefore, it is excellent in film-forming properties and leveling properties and can provide coating films or the like coat films with luster without using any of such film-forming ingredients as acrylic resins, polyoxyethylene prepolymers and so forth since the mutual fusion together of the TFE-based polymer particles is promoted by that dispersant.

Even when it further contains a conductive filler as incorporated therein, the fluororesin aqueous dispersion composition (1), which comprises the above-mentioned aliphatic polyoxyalkylene ether dispersant, is excellent in film-forming properties and leveling properties without using any of such film-forming ingredients as mentioned above and can provide the coat films formed therefrom with improved surface smoothness and luster.

Adequately employable as the aliphatic polyoxyalkylene ether dispersant in the fluororesin aqueous dispersion composition are polyoxyalkylene tridecyl ether surfactants, as described above. Polyoxyalkylene tridecyl ether surfactants can be suitably used with fluoropolymers such as TFE-based polymers.

Preferred as the fluororesin aqueous dispersion composition are those ones which comprise a fluoropolymer and a polyoxyalkylene isotridecyl ether surfactant.

The fluororesin aqueous dispersion composition which comprises the above-mentioned fluoropolymer and polyoxyalkylene isotridecyl ether surfactant is sometimes referred to herein as "fluororesin aqueous dispersion composition (2)" of the present invention. The odor emanation from the fluororesin aqueous dispersion composition (2) of the present invention is slight under the fluororesin processing conditions and the working environment will be affected only slightly and, in addition, the composition can be improved in dispersibility, mechanical stability and processability.

The polyoxyalkylene isotridecyl ether surfactant to be used in the fluororesin aqueous dispersion composition (2) of the present invention is not always required to have a 50% decomposition temperature of not lower than 250° C. but preferably has a 50% decomposition temperature of not lower than 250° C.

The polyoxyalkylene isotridecyl ether surfactant to be used in the fluororesin aqueous dispersion composition (2) of the present invention is represented by the general formula R—O-A-H (I).

In the above general formula (I), R is an alkyl group represented by the formula —$C_{13}H_{27}$.

The group R in general formula (I) has an average number of branches of 1.5 to 2.9 per molecule. If that number is smaller than 1.5, the dispersibility of the fluororesin aqueous dispersion will decrease and the mechanical stability thereof will be poor in certain instances. A preferred lower limit is 2.0. When the average number of branches per molecule exceeds 2.9, the carbon-carbon bonds and carbon-hydrogen bonds at the sites of branching are weak so that the oxidative cleavage is likely to occur on the occasion of raising the temperature to 250 to 400° C., which is ordinary in processing fluororesins. The substances resulting from the oxidative decomposition partly form a gaseous or misty phase, which is one of the causes of strong odor emanation and may disturb the working environment. A preferred upper limit is 2.5.

The average number of branches per molecule, so referred to herein, is the value obtained by using a $C_{13}$ NMR spectrometer.

In the above general formula (I), A represents a polyoxyalkylene chain in which the number of oxyethylene groups is 5 to 20 and the number of oxypropylene groups is 0 to 6.

The "polyoxyalkylene chain in which the number of oxyethylene groups is 5 to 20 and the number of oxypropylene groups is 0 to 6" so referred to herein means a polyoxyalkylene chain having 5 to 20 oxyethylene groups and 0 to 6 oxypropylene groups. The polyoxyalkylene chain is preferably one having oxyethylene groups and an oxypropylene group(s) alone. However, the oxypropylene group(s) is (are) an optional group(s), hence the polyoxyalkylene chain may not have any oxypropylene group.

When the polyoxyalkylene chain has no oxypropylene group, the antifoaming capacity may become low in some cases but the number of occurring oxypropylene groups will not affect the odor; no trouble will be caused at processing as far as the intended use in the practice of the present invention is concerned. A large number of oxypropylene groups than 6 results in a decrease in the dissolving power of the polyoxyalkylene isotridecyl ether surfactant, tending to cause a decrease in dispersion stability of fluoropolymers. A preferred upper limit to the number of oxypropylene groups is 3. The number of oxypropylene groups is preferably 0 (zero).

A preferred lower limit to the number of oxyethylene groups in the above polyoxyalkylene chain is 8, and a preferred upper limit thereto is 15.

The polyoxyalkylene chain is preferably one in which the number of oxyethylene groups is 8 to 15 and the number of oxypropylene groups is 0 to 3, more preferably one in which the number of oxyethylene groups is 8 to 15 and the number of oxypropylene groups is 0.

The above-mentioned polyoxyalkylene isotridecyl ether surfactant is preferably one which has an average number of branches of 2.0 to 2.5 per molecule and in which the number of oxyethylene groups is 8 to 15 and the number of oxypropylene groups is 0 (zero).

Generally, the polyoxyalkylene isotridecyl ether surfactant becomes highly hydrophilic as the length of the polyoxyalkylene chain increases and, when the chain length is short, it becomes more hydrophobic. Like in the case of the aliphatic polyoxyalkylene ether dispersant in the fluororesin aqueous dispersion composition (1) of the present invention, when the polyoxyalkylene isotridecyl ether surfactant is excessively hydrophilic or excessively hydrophobic, the fluororesin aqueous dispersion composition (2) containing the same is poor in processability.

It is desirable that the polyoxyalkylene isotridecyl ether surfactant has an HLB of 10 to 14; this is not critical, however. When the fluororesin aqueous dispersion composition (2) is to be used in dip coating, which is to be described later herein, the HLB is preferably 12 to 14 and, when an enamel coating is prepared by adding additives, which are to be described later herein, to the fluororesin aqueous dispersion composition (2) for use in spray coating, the HLB in question is preferably 10 to 13.

The polyoxyalkylene isotridecyl ether surfactant preferably shows a cloud point of 45 to 85° C. The cloud point is the temperature at which an aqueous surfactant solution becomes cloudy as the temperature is raised. Generally, its value becomes higher as the hydrophilicity increases and, as the hydrophobicity increases, its value becomes lower.

Therefore, in the case of the polyoxyalkylene isotridecyl ether surfactant, that value generally increases as the length of the polyoxyalkylene chain increases, and the value decreases with the decreasing chain length. When the cloud point of the polyoxyalkylene isotridecyl ether surfactant exceeds 85° C., the hydrophilicity becomes excessively high and the processability may become poor in certain instances. When it is below 45° C., the storage stability of the fluororesin aqueous dispersion at room temperature may become decreased in some cases and, in cases where the surfactant is used as a concentration aid to obtain a fluororesin aqueous dispersion, as described later herein, the supernatant will hardly become transparent even when cooled to 25° C. and phase separation may become difficult to attain in certain instances. A more preferred lower limit is 55° C., and a more preferred upper limit is 75° C.

A 0.1% aqueous solution of the polyoxyalkylene isotridecyl ether surfactant preferably shows a surface tension of not higher than 30 mN/m as determined at 25° C. using a surface tension measuring apparatus based on the Wilhelmy method. At levels exceeding 30 mN/m, coating compositions prepared by using the surfactant may be poor in applicability for re-coat in some cases.

The polyoxyalkylene isotridecyl ether surfactant is produced by reacting, in the manner of addition, ethylene oxide and propylene oxide with an oxo alcohol (hereinafter referred to as "raw material alcohol") represented by the general formula R—OH (R in the formula being as defined above) so that the number of oxyethylene groups and the number of oxypropylene groups in the reaction product may fall within the respective ranges specified hereinabove.

The raw material alcohol to be used for the production of the polyoxyalkylene isotridecyl ether surfactant is preferably an oxo alcohol synthesized by the oxo process from an olefin containing 12 carbon atoms prepared by trimerization of butene. This method of synthesis is preferred in particular on the occasion of commercial production.

The above-mentioned olefin containing 12 carbon atoms is preferably prepared by trimerization of butene. When the olefin containing 12 carbon atoms is a butene trimer, the number of branches in R in the general formula R—OH can be rendered small and it is easy to obtain the olefin with a high purity.

When, in the practice of the present invention, the olefin containing 12 carbon atoms is a butene trimer, the average number of branches in the above-mentioned group R can fall within the range given hereinabove for the polyoxyalkylene isotridecyl ether surfactant and odor emanation hardly occurs.

Meanwhile, the olefins containing 12 carbon atoms conventionally used in the oxo process are the products of addition reaction of propylene alone or a mixture of butene and propylene and, the number of branches of R exceeds the range specified above for the average number of branches and they have the problem of strong odor emanation. In the case of the propylene tetramer, the number of branches in R, as expressed in terms of average number of branches per molecule, is 3.5 to 3.8 and, in the case of the butene-propylene adduct, it is 3.0.

When, in the practice of the present invention, the olefin containing 12 carbon atoms is the butene trimer, the raw material alcohols can be obtained at a high purity level, for example not lower than 90%, preferably not lower than 95%, as described later herein, while the odor emanation can be reduced. On the contrary, those conventional olefins containing 12 carbon atoms obtained by subjecting butene-propylene mixtures to addition reaction generally give oxo alcohols containing 13 carbon atoms only at purity levels lower than 60% and have a strong odor emanation problem.

The raw material alcohol for the polyoxyalkylene isotridecyl ether surfactant is preferably an oxo alcohol synthesized from the above-mentioned olefin containing 12 carbon atoms by the oxo process.

The oxo process generally comprises reacting an olefin containing N carbon atoms (N being an integer of not less than 1) with carbon monoxide and hydrogen in the presence of an appropriate catalyst for hydroformylation to give an aldehyde containing (N+1) carbon atoms. The raw material alcohol is obtained by reducing this aldehyde. The oxo process mentioned above can be carried out in the conventional manner. The $C_{13}$ raw material alcohol can be produced in an efficient manner by carrying out the oxo process at relatively high temperatures for the progress of the hydroformylation reaction, followed by the hydrogenation reaction.

The above raw material alcohol is preferably one having a purity of not lower than 90%. When the purity is lower than 90%, the fluororesin aqueous dispersion composition (2) obtained, under the processing conditions, tends to give strong odor due to evaporation of shorter-chain-length impurities. More preferably, the purity is not lower than 95%, and a more preferred lower limit is 98%. The raw material alcohol is not always required to have 100% purity but, generally, the purity may be less than 100%.

The polyoxyalkylene isotridecyl ether surfactant is used in an amount of 1 to 21% by mass based on the mass of the solid matter in the fluoropolymer. The "solid matter" is defined in the same manner as defined hereinabove for the fluororesin aqueous dispersion composition (1) of the present invention. When the above value is less than 1% by mass, the fluoropolymer in the fluororesin aqueous dispersion composition (2) obtained may fail to stably exist in a dispersed state in some instances. Levels exceeding 21% by mass are unfavorable from the economical viewpoint. The polyoxyalkylene isotridecyl ether surfactant preferably amounts to 2 to 10% by mass relative to the mass of the solid matter in the fluoropolymer.

The fluororesin aqueous dispersion composition (2) of the present invention comprises the polyoxyalkylene isotridecyl ether surfactant with a fluoropolymer.

The term "fluoropolymer" as used herein means a polymer containing carbon atom-bound fluorine atoms.

The fluoropolymer is not particularly restricted but includes, among others, products obtained by polymerizing one or more of such fluorine-containing monomers as chlorotrifluoroethylene [CTFE], trifluoroethylene, tetrafluoroethylene [TFE], hexafluoropropylene [HFP], and perfluoro (alkylvinylether) [PAVE] species. The fluoropolymer may be one obtained by polymerizing one or more of such fluorine-containing monomers as mentioned above together with one or more of fluorine-free monomers such as ethylene and propylene.

Preferred as the fluoropolymer are TFE homopolymers, modified polytetrafluoroethylene [modified PTFE], ethylene/TFE copolymers, ethylene/CTFE copolymers, propylene/TFE copolymers, TFE/HFP copolymers, TFE/PAVE copolymers and the like. More preferred among them are those which are obtained by polymerization of one or more monomers selected from the group consisting of TFE, HFP and PAVEs and can be processed at temperatures at which the polyoxyalkylene isotridecyl ether surfactant or the like surfactant will not remain in the fluororesin aqueous dispersion composition (2) of the present invention. The temperature at which the surfactant will not remain in the fluororesin aqueous dispersion composition (2) of the present invention is generally 300° C. or above.

More preferred as the fluoropolymer are TFE homopolymers and modified PTFE species. The definition and specific examples, among others, of the modified PTFE are as described hereinabove referring to the fluororesin aqueous dispersion composition (1) of the present invention.

The above fluoropolymer is preferably one having a number average molecular weight of several thousand to zones of millions. When the number average molecular weight is low, the polymer may be dispersed with ease even when the polyoxyalkylene isotridecyl ether surfactant is not so strong in dispersing power, but the coated materials from the fluororesin aqueous dispersion composition (2) of the present invention may be poor in mechanical strength in some cases. When the number average molecular weight is high, the polymer may be poor in dispersibility in certain instances. A more preferred lower limit is 100,000, and a more preferred upper limit is 30,000,000.

The fluoropolymer preferably has an average particle size of 0.05 to 0.5 μm. When the size is smaller than 0.05 μm, the applied coats formed from the fluororesin aqueous dispersion composition (2) tend to readily undergo cracking on the occasion of heating. When the size exceeds 0.5 μm, the dispersibility may become poor in certain cases. A more preferred lower limit is 0.1 μm, and a more preferred upper limit is 0.4 μm.

The particles of the fluoropolymer may be of the core/shell type having a core-shell double layer structure. The core/shell type fluoropolymer is not particularly restricted but may be any of those having such a double layer structure, including, among others, those described hereinabove referring to the fluororesin aqueous dispersion composition (1) of the present invention. When those conventional core/shell type fluoropolymer particles having a modified PTFE species as the shell component are made into aqueous dispersions, like in the case of those particles comprising a modified PTFE species used as the fluoropolymer, surfactants higher in dispersibility are required as compared with single layer particles. On the contrary, the fluororesin aqueous dispersion composition (2) of the present invention comprises a fluororesin aqueous dispersion comprising the polyoxyalkylene isotridecyl ether surfactant having high dispersibility and, therefore, such core/shell particles can be adequately used for the composition (2).

The solid matter in the fluoropolymer amounts to 10 to 70% by mass, more preferably 30 to 70% by mass, still more preferably not less than 35% by mass but not more than 65% by mass, of the total mass of the fluororesin aqueous dispersion. The "solid matter" and "total mass of the fluororesin aqueous dispersion" are as defined hereinabove referring to the fluororesin aqueous dispersion composition (1). When the above value is smaller than 30% by mass, the resin-coverage amount per dipping will become small in case of forming coated materials, which are to be mentioned later herein, by dipping processing using the fluororesin aqueous dispersion obtained as a fluororesin aqueous dispersion composition (2) of the present invention, for instance, and, therefore, in certain instances, the number of repetitions of dipping has to be increased to attain a certain level of resin coverage. Further, the aqueous dispersion becomes low in viscosity and, therefore, the fluororesin tends to settle, possibly causing a storage stability problem. On the other hand, when the above value exceeds 70% by mass, the fluororesin aqueous dispersion obtained will become deteriorated in dispersibility.

The fluoropolymer can be obtained by any of the polymerization methods known in the art, such as suspension polymerization, emulsion polymerization, bulk polymerization and solution polymerization. Suspension polymerization and emulsion polymerization are preferred in view of their frequent use in the industry, and emulsion polymerization is more preferred from the viewpoint that the dispersions of as-polymerized polymers can be used as such in preparing fluororesin aqueous dispersions. As the specific embodiments of the emulsion polymerization, there may be mentioned those method described hereinabove referring to the fluororesin aqueous dispersion composition (1) of the present invention.

As mentioned above, the fluororesin aqueous dispersion composition (2) of the present invention includes the above-mentioned fluororesin aqueous dispersion itself and a composition resulting from further addition of an additive or additives to the fluororesin aqueous dispersion according to intended use. Therefore, the fluororesin aqueous dispersion composition (2) of the present invention may be one resulting from addition of an additive according to intended use to the fluororesin aqueous dispersion in which the polyoxyalkylene isotridecyl ether surfactant is used.

The fluororesin aqueous dispersion composition (2) of the present invention can be prepared in the same manner as in preparing the fluororesin aqueous dispersion composition (1) of the present invention. Mention thus may be made of the method which comprises concentrating the dispersions of as-polymerized polymers and adding the polyoxyalkylene isotridecyl ether surfactant to the concentrate as a dispersant.

The fluororesin aqueous dispersion contains water in addition to the fluoropolymer and polyoxyalkylene isotridecyl ether surfactant. Generally, deionized water is used as the water.

The fluororesin aqueous dispersion composition (2) may be one obtained by adding one or more additives adequate for the intended use of the composition to the fluororesin aqueous composition.

The "additives" so referred to herein include those substances which are generally added to ordinary aqueous dispersions. Thus, the additives include those conventionally called additives or compounding ingredients, among others. While there seems to be no clear distinction between additives and compounding ingredients, the above-mentioned additives include, within the meaning thereof, those additives and compounding ingredients.

The additives are preferably selected from among pigments, fillers, film-forming ingredients and/or thickening agents. The pigments are not particularly restricted but includes those which is resistant to heat, namely will not deteriorate at or above the melting point of the fluoropolymer, for example carbon black; ultramarine blue; oxide pigments each comprising one or more oxides of metals such as Cr, Ti, Co, Ni, Fe, Mn, Cu and Sb; inorganic calcined pigments such as cadmium-based pigments; and organic pigments such as phthalocyanine blue, phthalocyanine green, and perylene pigments.

The pigment addition level is preferably 1 to 40% by mass relative to the mass of the fluoropolymer solid matter.

The fillers are not particularly restricted but include, among others, talc, mica, clay, glass flakes, and glass beads. Some of the fillers, for example mica and glass flakes, are used also as pigments.

The thickening agents are not particularly restricted but include, among others, methylcellulose, polyvinyl alcohol, and polyacrylic acid copolymers.

The film-forming ingredients are not particularly restricted but include, among others, polymethacrylate copolymers and nonionic surfactants.

The total addition level of the fillers, thickening agents and film-forming ingredients is preferably 0.1 to 40% by mass relative to the total mass of the fluororesin aqueous dispersion composition.

The additives further include such nonionic surfactants other than the polyoxyalkylene isotridecyl ether surfactant as fluorine-based or silicone-based ones as well as anionic surfactants, thixotropic agents, various leveling agents, colorants, etc.

The fluororesin aqueous dispersion composition (2) of the present invention comprises the polyoxyalkylene isotridecyl ether surfactant in lieu of the alkylphenol-derived dispersants in conventional use, and the polyoxyalkylene isotridecyl ether surfactant is an alkyl ether type dispersant and, therefore, has no endocrine disrupting activity and has little influence on the environment. Further, the polyoxyalkylene isotridecyl ether surfactant in the fluororesin aqueous dispersion composition (2) of the present invention comprises an alkyl group containing 13 carbon atoms and having an average number of branches of 1.5 to 2.9 per molecule, together with the above-mentioned polyoxyalkylene group having 5 to 20 oxyethylene groups and 0 to 6 oxypropylene groups, hence is well balanced between hydrophobicity and hydrophilicity and, therefore, the composition (2) is excellent in fluoropolymer dispersibility, in mechanical stability, and inprocessability in forming coated materials by re-coat, as described later herein. The fluororesin aqueous dispersion composition (2) of the present invention provides such effects and, in addition, it hardly undergoes thermal degradation under the drying and baking processing conditions in the ordinary process of processing fluororesins, hence the odor emanation is suppressed and the working environment is little affected.

The mechanism by which the odor emanation is suppressed is not clear but is supposed to be as follows. Thus, the conventional polyoxyalkylene isotridecyl ether surfactants sometimes contain impurities shorter in chain length in large amounts and, presumably, the impurities partly volatilize at temperatures of 250 to 400° C., which are ordinary fluororesin processing conditions, to form a gaseous or misty phase, causing strong odor emanation. However, the polyoxyalkylene isotridecyl ether surfactant containing in the fluororesin aqueous dispersion composition (2) of the present invention preferably has a purity of not lower than 90% and, therefore, the odor emanation is supposedly suppressed.

Those polyoxyalkylene isotridecyl ether surfactants which have a large number of branches in the alkyl group tend to undergo oxidative degradation at the carbon-carbon bond and/or carbon-hydrogen bond at the sites of branching in the alkyl group under ordinary processing conditions for fluororesins. Those polyoxyalkylene isotridecyl ether surfactants in conventional use have a large number of branches in the alkyl group and, therefore, the oxidative degradation products are thought to serve as causes of odor emanation. On the contrary, the polyoxyalkylene isotridecyl ether surfactant contained in the fluororesin aqueous dispersion composition (2) of the present invention has a small average number of branches, namely not greater than 2.9 per molecule, so that the odor emanation due to oxidative degradation is supposedly suppressed.

The above-mentioned fluororesin aqueous dispersion composition (1) of the present invention can be properly used as a coating composition. The fluororesin aqueous dispersion composition (1) of the present invention, which is used as a coating composition in the practice of the present invention, is hereinafter referred to as "fluorine-containing aqueous coating composition" of the present invention.

The fluorine-containing aqueous coating composition of the present invention is a fluorine-containing aqueous coating composition comprising a tetrafluoroethylene polymer and an aliphatic polyoxyalkylene ether dispersant incorporated therein, and the aliphatic polyoxyalkylene ether dispersant has a 50% decomposition temperature of not lower than 250° C.

The above fluorine-containing aqueous coating composition comprises or has the same components, composition, physical properties and advantages as the fluororesin aqueous dispersion composition (1) of the present invention has when it is in the form of a dispersion. Like the fluororesin aqueous dispersion composition (1), it may further comprise one or more of the electrically conductive fillers, thickening agents, additives and so forth as incorporated therein.

The thickening agent addition level is preferably 0.03 to 20% by mass relative to the total mass of the fluorine-containing aqueous coating composition. When it is lower than 0.03% by mass, the resulting fluorine-containing aqueous coating composition may have an excessively low viscosity and become difficult to efficiently apply in some instances. When it exceeds 20% by mass, the resulting fluorine-containing aqueous coating composition will become excessively viscous and it will become difficult to control the applying weight, with the result that the coating films will not become uniform but the film-forming properties and/or luster may possibly deteriorate. A more preferred upper limit is 10% by mass.

Generally, the fluorine-containing aqueous coating composition of the present invention preferably has a coating solid matter content of 15 to 75% by mass based on the fluorine-containing aqueous coating composition. The term "coating solid matter" as used herein means the residue of the coating composition as found after application of the fluorine-containing aqueous coating composition to a substrate, followed by drying at a temperature not higher than 100° C. and further followed by 60 minutes of baking at 350 to 400° C. The coating solid matter includes the TFE-based polymer and the conductive filler optionally incorporated and may further comprise such an additive or additives as a pigment and so forth. In this specification, the "coating solid matter content" is expressed in terms of % by mass of the above-defined residue relative to the mass of the fluorine-containing aqueous coating composition applied to the substrate.

When the above-defined coating solid matter content is less than 15% by mass, the coverage amount per application in the step of coating using the resulting fluorine-containing aqueous coating composition will become decreased, possibly resulting in failure to perform efficient coating in certain cases. When it exceeds 75% by mass, the dispersibility of the fluorine-containing aqueous coating composition will become decreased, the coating films will not become uniform, and the film-forming properties and luster may possibly be deteriorated. A preferred lower limit is 30% by mass, and a preferred upper limit is 60% by mass.

The fluororesin aqueous dispersion composition (2) of the present invention can be also suitably used as a coating composition. When it is used as a coating composition, the coating solid matter content is preferably the same as in the above-mentioned fluorine-containing aqueous coating composition.

The fluororesin aqueous dispersion composition (1) and fluororesin aqueous dispersion composition (2) of the present invention can be suitably and widely used in forming coated materials, including the case where they are used as the coating compositions mentioned above. The coated materials are formed on substrates by applying the above fluororesin aqueous dispersion composition (1) or fluororesin aqueous dispersion composition (2) to the surface thereof. The fluororesin aqueous dispersion composition (1) or fluororesin aqueous dispersion composition (2) to be used for forming coated materials may generally be one resulting from addition, to the corresponding fluororesin aqueous dispersion, of a pigment, a filler, a thickening agent and/or a film-forming ingredient as desired, as mentioned above (hereinafter, such composition is sometimes referred to "enamel coating").

The substrates are not particularly restricted but can be appropriately selected according to the intended use. For example, there may be mentioned, among others, heat-resistant fibers, such as glass fibers, carbon fibers, ceramic fibers, metal fibers and Kevlar fibers, and woven fabrics and knitted fabrics made of such heat-resistant fibers; sheets of metals such as aluminum, stainless steel, iron, and ceramics; porous steel sheets; polymer moldings; glass; and earthenware.

The above-mentioned coated materials are generally obtained by applying the fluororesin aqueous dispersion composition (1) or fluororesin aqueous dispersion composition (2) to such substrates as mentioned above, followed by appropriate drying and baking by heating at temperatures not lower than the melting point of the fluororesin, further followed by cooling.

The above application is generally carried out after subjecting the substrates to degreasing treatment, surface roughening treatment, primer application and drying.

So long as the fluororesin aqueous dispersion composition (1) or fluororesin aqueous dispersion composition (2) occurs as a dispersion, the method of application is not particularly restricted but may be any of those methods suited for application of aqueous dispersions, including, among others, impregnation coating, spray coating (spraying), roll coating, spin coating, barrel coating, curtain flow coating, and dip coating (dipping). When the substrates are heat-resistant fibers, woven fabrics, knitted fabrics or the like, impregnation coating is preferred. In cases where coated materials are to be formed on electrodes, the fluororesin aqueous dispersion is kneaded with a powder of carbon fluoride, manganese dioxide or a like positive electrode active substance to integrate the powder particles, followed by application of the resulting paste-like fluororesin aqueous dispersion composition (1) or fluororesin aqueous dispersion composition (2).

The drying can be generally carried out by combining drying at room temperature and 30 seconds to 5 minutes of heating at a temperature of 80 to 120° C.

The baking can be generally carried out by heating at 350 to 400° C. for 1 to 5 minutes.

The articles to be provided with the above coated materials are not particularly restricted but include, among others, ones required to have compressive strain resistance and/or oil resistance, such as gland packing, bag filters, and gaskets; ones required to have electrical insulating properties, such as high-frequency printed circuit boards; ones required to have wear resistance, such as conveyor belts; ones required to have chemical resistance, such as reaction kettles, ducts, piping, valves, and pumps; ones required to have corrosion resistance, such as stirring blades, tanks, vessels, columns, and centrifugal machines; ones required to have nonstickiness, such as cooking sheets, pots, hotplates, frying pans, rice cookers, home bakeries, rice cake makers, and drying rolls and cylinder rolls for papermaking; ones required to have release properties, such as rolls in office automation [OA] machines, belts in OA machines, papermaking rolls, calender rolls for film production, and molds for injection molding; roof materials for membrane-structured buildings such as air domes; and ones required to have lubricity, such as irons and sliding members (oilless bearings). Among them, those articles obtained by using the conductive filler-containing aqueous dispersion composition mentioned hereinabove can be used not only as those mentioned above but also further as conductive sliding parts or the like in household electric appliances and so forth.

The articles mentioned above include the respective substrates in addition to the coated materials mentioned above.

The fluororesin aqueous dispersion composition (1) and fluororesin aqueous dispersion composition (2) can be used not only in forming coated materials but also as adhesive compositions.

In cases where the fluororesin aqueous dispersion composition (1) and fluororesin aqueous dispersion composition (2) are used as adhesive compositions, as mentioned above, they are used as antidripping agents for preventing powders of polycarbonate [PC] or a PC-ABS resin polymer alloy or the like from melting and sagging on the occasion of curing; as dusting preventing agents to be added to chemical fertilizers, soil conditioners such as lime, cement or other powdery civil engineering and construction materials, for instance, to prevent dusting, and in other fields of application.

The fluororesin aqueous dispersion composition (1) and fluororesin aqueous dispersion composition (2) can also be used as raw materials for coated materials for coating molds to be used in molding synthetic resins such as epoxy resins, urethane foams, and synthetic rubbers such as rigid urethane rubbers by utilizing their nonstickiness when melt-processable fluoropolymers such as PFAs and FEPs are used, or when PTFE species are used, as fluororesin fibers obtained by adding viscose or the like to the compositions, spinning the resulting mixtures under pressure to give fibrous products, and curing and stretching the fibrous products.

BEST MODES FOR CARRYING OUT THE INVENTION

The following examples illustrate the present invention in further detail. These examples are, however, by no means limitative of the scope of the present invention.

The trademarks of the surfactants used in the examples are given below.

Dispanol TOC: polyoxyethylene isotridecyl ether (product of NOF Corporation; the alkyl group being derived from a propylene-butene mixture)

Leocol TD-90: polyoxyethylene isotridecyl ether (product of Lion Corporation; the alkyl group being derived from a propylene-butene mixture)

Nonion C-13: polyoxyethylene tridecyl ether (product of NOF Corporation)

Nonion EH205.5: polyoxyethylene octyl ether (product of NOF Corporation)

Emulgen 109P: polyoxyethylene lauryl ether (product of Kao Corporation)

Leox WC-145: polyoxyethylene stearyl ether (product of Lion Corporation)

Lutensol TO-8: polyoxyethylene isotridecyl ether (product of BASF; the alkyl group being derived from butene trimer)

Noigen TDS-80: polyoxyethylene isotridecyl ether (product of Daiichi Kogyo Seiyaku; the alkyl group being derived from butene trimer)

Nonion EAD-13: polyoxyethylene alkyl ether (product of NOF Corporation)

Nonion EAD-15: polyoxyethylene alkyl ether (product of NOF Corporation)

REFERENCE EXAMPLE 1

Oxidative Degradation Rates of Polyoxyalkylene Ether Dispersants

Lutensol TO-8, Noigen TDS-80, Leocol TD-90, Nonion EAD-13 and Nonion EAD-15 (each about 10 mg) were each placed in a differential scanning thermogravimetric analyzer [DTGA] (product of Seiko Instruments), each sample was heated from room temperature to 200° C. at a rate of 10° C./minute while nitrogen was passed through the apparatus at a flow rate of 200 ml/minute, and the loss in mass, namely the difference between the mass of the sample at room temperature before temperature raising and the mass of the sample after heating, was determined using a thermobalance. Then, using air in lieu of nitrogen, the loss in mass was measured in the same manner. The oxidative degradation percentage was calculated based on the difference found upon subtraction of the loss in mass under nitrogen from the loss in mass under air.

REFERENCE EXAMPLE 2

50% Decomposition Temperatures of Polyoxyalkylene Ether Dispersants

The same dispersants (each about 10 mg) as used in Reference Example 1 were each placed in the above-mentioned differential scanning thermogravimetric analyzer [DTGA] and heated from room temperature at a rate of 10° C./minute while passing air through the apparatus at a rate of 200 ml/minute, and the temperature at which the weight loss amounted to 50% of the mass of the sample at room temperature before temperature raising was recorded as the 50% decomposition temperature.

The results are shown in Table 1.

TABLE 1

| Measurement temperature | Oxidative degradation percentage 200° C. | | | 50% Decomposition temperature (° C.) (measured in air) |
|---|---|---|---|---|
| Measurement atmosphere | Air | $N_2$ | Difference (Air – $N_2$) | |
| Leocol TD-90 | 11.7% | 6.8% | 4.9% | 245 |
| Nonion EAD-13 | 7.3% | 4.4% | 2.9% | 245.5 |
| Nonion EAD-15 | 5.0% | 1.6% | 3.4% | 271 |
| Noigen TDS-80 | 4.7% | 3.1% | 1.6% | 271 |
| Lutensol TO-8 | 3.8% | 3.3% | 0.5% | 290 |

EXAMPLE 1

A dispersion of a core/shell TFE-based polymer (I) having a number average molecular weight of 7,500,000 and an average particle size of 250 nm and having a double layer structure comprising the core comprising a tetrafluoroethylene homopolymer [TFE homopolymer] and the shell comprising a modified polytetrafluoroethylene [modified PTFE] produced from tetrafluoroethylene [TFE] and 0.15% by mass of perfluoropropyl vinyl ether [PPVE] relative to the total mass of TFE and PPVE was concentrated using Lutensol TO-8, and a dispersion of the core/shell TFE-based polymer (I) with a solid matter concentration of 60% by mass was obtained by adjusting the dispersant addition level using Lutensol TO-8 as the dispersant and further using pure water so that the dispersant addition level might amount to 4.0% by mass based on the main solid matter. Using this dispersion, a coating composition was prepared according to the formulation 1 given in Table 2. Coating films were formed from the coating composition obtained, and were measured for various physical properties, namely cracking limit film thickness, surface roughness, and gloss. The results are shown in Table 3.

EXAMPLE 2

Concentration and preparation were carried out in the same manner as in Example 1 except that the dispersant addition level was adjusted to 6.0% by mass relative to the main solid matter. Coating films were formed from the coating composition obtained and measured for various physical properties. The results are shown in Table 3.

EXAMPLE 3

Concentration and preparation were carried out in the same manner as in Example 1 except that the dispersant addition level was adjusted to 8.0% by mass relative to the main solid matter. Coating films were formed from the coating composition obtained and measured for various physical properties. The results are shown in Table 3.

EXAMPLE 4

Concentration and preparation were carried out in the same manner as in Example 1 except that the dispersant addition level was adjusted to 12.0% by mass relative to the main solid matter. Coating films were formed from the coating composition obtained and measured for various physical properties. The results are shown in Table 3.

EXAMPLE 5

Concentration and preparation were carried out in the same manner as in Example 2 except that a core/shell TFE-based polymer (II) having a number average molecular weight of 5,000,000 and an average particle size of 250 nm and having a double layer structure comprising the core comprising a TFE homopolymer and the shell comprising a modified PTFE produced from tetrafluoroethylene [TFE] and 0.2% by mass of chlorotrifluoroethylene-[CTFE] relative to the total mass of TFE and CTFE was used in lieu of the core/shell TFE-based polymer (I). Coating films were formed from the coating composition obtained and measured for various physical properties. The results are shown in Table 3.

EXAMPLE 6

Concentration and preparation were carried out in the same manner as in Example 2 except that a TFE homopolymer having a number average molecular weight of 5,500,000 and an average particle size of 250 nm was used in lieu of the core/shell TFE-based polymer (I). Coating films were formed from the coating composition obtained and measured for various physical properties. The results are shown in Table 3.

EXAMPLE 7

Concentration and preparation were carried out in the same manner as in Example 2 except that Noigen SD-70 (trademark, product of Daiichi Kogyo Seiyaku, 50% decomposition temperature: 265° C.) was used as the dispersant. Coating films were formed from the coating composition obtained and measured for various physical properties. The results are shown in Table 3.

EXAMPLE 8

Concentration and preparation were carried out in the same manner as in Example 2 except that Noigen TDS-80 (trademark, product of Daiichi Kogyo Seiyaku) was used as the dispersant. Coating films were formed from the coating composition obtained and measured for various physical properties. The results are shown in Table 3.

EXAMPLE 9

Concentration and preparation were carried out in the same manner as in Example 2 except that DKS NL-Dash 410 (trademark, product of Daiichi Kogyo Seiyaku, 50% decomposition temperature: 290° C.) was used as the dispersant. Coating films were formed from the coating composition obtained and measured for various physical properties. The results are shown in Table 3.

EXAMPLE 10

Concentration and preparation were carried out in the same manner as in Example 2 except that Lutensol TO-10 (trademark, product of BASF, 50% decomposition temperature: 300° C.) was used as the dispersant. Coating films were formed from the coating composition obtained and measured for various physical properties. The results are shown in Table 3.

EXAMPLE 11

Concentration and preparation were carried out in the same manner as in Example 2 except that Lutensol TO-8 and Leocol TD-90 were used as the dispersants and the dispersant addition levels were adjusted so that Lutensol TO-8 amounted to 4.0% by mass and Leocol TD-90 to 2.0% by mass relative to the main solid matter ([TO-8]: [TD-90]=2: 1). Coating films were formed from the coating composition obtained and measured for various physical properties. The results are shown in Table 3.

EXAMPLE 12

A coating composition was prepared in the same manner as in Example 2 except that a TFE copolymer [PFA] having an average particle size of 200 nm and produced from TFE and 3.5% by mass of PPVE relative to the total mass of TFE and PPVE was used in lieu of the core/shell TFE-based polymer (I) and that it was prepared according to the composition 2 given in Table 2. Coating films were formed from the coating composition obtained and measured for various physical properties. The results are shown in Table 3.

EXAMPLE 13

A coating composition was prepared in the same manner as in Example 2 except that a TFE copolymer [FEP] having an average particle size of 150 nm and produced from TFE and 13.2% by mass of hexafluoropropylene [HFP] relative to the total mass of TFE and HFP was used in lieu of the core/shell TFE-based polymer (I) and that it was prepared according to the composition 2 given in Table 2. Coating films were formed from the coating composition obtained and measured for various physical properties. The results are shown in Table 3.

COMPARATIVE EXAMPLE 1

Concentration and preparation were carried out in the same manner as in Example 2 except that Leocol TD-90, which was used in Example 11, was used as the dispersant. Coating films were formed from the coating composition obtained and measured for various physical properties. The results are shown in Table 3.

COMPARATIVE EXAMPLE 2

Concentration and preparation were carried out in the same manner as in Example 2 except that Nonion EAD-13 was used as the dispersant. Coating films were formed from the coating composition obtained and measured for various physical properties. The results are shown in Table 3.

COMPARATIVE EXAMPLE 3

Concentration and preparation were carried out in the same manner as in Example 6 except that Leocol TD-90, which was used in Example 11, was used as the dispersant. Coating films were formed from the coating composition obtained and measured for various physical properties. The results are shown in Table 3.

COMPARATIVE EXAMPLE 4

Concentration and preparation were carried out in the same manner as in Example 12 except that Leocol TD-90, which was used in Example 11, was used as the dispersant. Coating films were formed from the coating composition obtained and measured for various physical properties. The results are shown in Table 3.

COMPARATIVE EXAMPLE 5

Concentration and preparation were carried out in the same manner as in Example 13 except that Leocol TD-90, which was used in Example 11, was used as the dispersant. Coating films were formed from the coating composition obtained and measured for various physical properties. The results are shown in Table 3.

Measurement Methods

<Cracking Limit Film Thickness>

The coating compositions obtained in Examples 1 to 13 and Comparative Examples 1 to 5 were each applied to non-blast-finished aluminum sheets by spraying so that the film thickness might vary stepwise. The coatings obtained were dried at 80° C. for 15 minutes and then baked at 380° C. for 20 minutes. The surface of each coating film obtained was observed under an optical microscope at a magnification of 20. The thickness of the thinnest portion having a crack was taken as the cracking limit film thickness.

<Surface Roughness>

The same samples as subjected to measurement for cracking limit film thickness were used and the crack-free portions of the coating films were measured for surface roughness [Ra] using Surfcom 470A (trademark, product of Tokyo Seimitsu Co.).

<Gloss>

EK-1909BKN (trademark, product of Daikin Industries) was applied, by spraying, to non-blast-finished aluminum sheets to a thickness of 10 to 15 μm followed by 15 minutes of drying at 80° C. The coating compositions obtained in Examples 1 to 13 and Comparative Examples 1 to 5 were each applied, by spraying, to the aluminum sheets obtained to a thickness of 10 to 15 μm. After 15 minutes of drying at 80° C., the coating films were baked at 380° C. for 20 minutes. The coating films thus obtained were measured for gloss using UGV-5K (trademark, a digital variable gloss meter, product of Suga Test Instruments Co.) at an angle of incidence of 60° and a light receiving angle of 60°.

TABLE 2

| Composition 1 | % by mass | Composition 2 | % by mass |
| --- | --- | --- | --- |
| TFE-based polymer dispersion | 76 | TFE-based polymer dispersion | 72 |
| Thickening agent | 2.5 | Thickening agent | 4 |
| Sodium lauryl sulfate | 0.5 | Methylcellulose | 0.2 |
| Toluene | 2 | Water | 23.8 |
| Water | 19 | | |

Thickening agent (special thickening agent, product of Daikin Industries)
Sodium lauryl sulfate (product of New Japan Chemical),
Methylcellulose (product of Matsumoto Yushi Seiyaku)

TABLE 3

| | | TFE-based polymer | | Dispersant | | Cracking | | |
|---|---|---|---|---|---|---|---|---|
| | Species | Average particle size (nm) | Average molecular weight (×10⁴) | 50% Decompn temp. (° C.) | Addition level (% by mass) | limit film thickness (μm) | Surface roughness [Ra] (μm) | Gloss (%) [60°/60°] |
| Example 1 | Core/shell TFE-based polymer (I) | 250 | 750 | 290 | 4.0 | 26 | 0.25 | 32 |
| 2 | Core/shell TFE-based polymer (I) | 250 | 750 | 290 | 6.0 | 28 | 0.25 | 32 |
| 3 | Core/shell TFE-based polymer (I) | 250 | 750 | 290 | 8.0 | 28 | 0.25 | 31 |
| 4 | Core/shell TFE-based polymer (I) | 250 | 750 | 290 | 12.0 | 28 | 0.28 | 31 |
| 5 | Core/shell TFE-based polymer (II) | 250 | 500 | 290 | 6.0 | 30 | 0.2 | 33 |
| 6 | TFE homopolymer | 250 | 550 | 290 | 6.0 | 35 | 0.25 | 30 |
| 7 | Core/shell TFE-based polymer (I) | 250 | 750 | 270 | 6.0 | 28 | 0.25 | 32 |
| 8 | Core/shell TFE-based polymer (I) | 250 | 750 | 265 | 6.0 | 25 | 0.3 | 30 |
| 9 | Core/shell TFE-based polymer (I) | 250 | 750 | 290 | 6.0 | 30 | 0.25 | 35 |
| 10 | Core/shell TFE-based polymer (I) | 250 | 750 | 300 | 6.0 | 35 | 0.25 | 35 |
| 11 | Core/shell TFE-based polymer (I) | 250 | 750 | 290, 245 | 4.0 + 2.0 | 24 | 0.28 | 30 |
| 12 | PFA | 200 | 80 | 290 | 6.0 | 35 | 0.3 | 56 |
| 13 | FEP | 150 | 55 | 290 | 6.0 | 30 | 0.3 | 48 |
| Compar. Ex. 1 | Core/shell TFE-based polymer (I) | 250 | 750 | 245 | 6.0 | 13 | 0.6 | 11 |
| 2 | Core/shell TFE-based polymer (I) | 250 | 750 | 245 | 6.0 | 15 | 0.7 | 13 |
| 3 | TFE homopolymer | 250 | 550 | 245 | 6.0 | 17 | 0.6 | 9 |
| 4 | PFA | 200 | 80 | 245 | 6.0 | 10 | 1.3 | 13 |
| 5 | FEP | 150 | 55 | 245 | 6.0 | 11 | 1.2 | 12 |

As the results shown in Table 3 indicate, the coating compositions of Examples 1 to 10, 12 and 13, in which the aliphatic polyoxyalkylene ether dispersants used had a 50% decomposition temperature of not lower than 250° C., gave the obtained coating films superior in cracking limit film thickness, surface roughness and gloss as compared with the coating compositions of Comparative Examples 1 to 5, in which dispersants showing a 50% decomposition temperature of lower than 250° C. alone were used. The coating films obtained from the coating composition of Example 11, in which an aliphatic polyoxyalkylene ether dispersant showing a 50% decomposition temperature of not lower than 250° C. and a dispersant showing a 50% decomposition temperature of lower than 250° C. were used in combination, give coating films slightly inferior in the physical properties mentioned above to the coatings obtained in Example 2, in which the former dispersant was used alone, but definitely superior to the coatings of Comparative Examples 1 and 2. In Examples 7 to 10, the above-mentioned physical properties became better as the 50% decomposition temperature of the aliphatic polyoxyalkylene ether dispersant increased.

The coating composition of Example 12, in which a PFA was used, and the coating composition of Example 13, in which an FEP was used, gave coating films markedly improved in the physical properties mentioned above as compared with the coating compositions of Comparative Example 4 and Comparative Example 5, in which the same polymers were used respectively.

EXAMPLE 14

A dispersion of a core/shell TFE-based polymer (I) having a number average molecular weight of 7,500,000 and an average particle size of 250 nm and having a double layer structure comprising the core comprising a TFE homopolymer and the shell comprising a modified PTFE produced from tetrafluoroethylene [TFE] and 0.15% by mass of perfluoropropyl vinyl ether [PPVE] relative to the total mass of TFE and PPVE was concentrated using Lutensol TO-8, the same dispersant as used in Example 1, and a dispersion of the core/shell TFE-based polymer (I) with a solid matter concentration of 60% by mass was obtained by adjusting the dispersant addition level using Lutensol TO-8 as the dispersant and further using pure water so that the dispersant addition level might amount to 7.3% by mass based on the main solid matter. Using this dispersion, a coating composition was prepared according to the formulation 3 given in Table 4. Therein was incorporated 2.5% by volume, relative to the main solid matter, of ECP (trademark, Ketjen black, product of Lion Corporation) as a conductive filler. Coating films were formed from the coating composition obtained, and were measured for various physical properties, namely cracking limit film thickness, surface roughness, gloss, and surface resistivity. The results are shown in Table 5.

EXAMPLE 15

Concentration and preparation were carried out in the same manner as in Example 14 except that a core/shell TFE-based polymer (II) having a number average molecular weight of 5,000,000 and an average particle size of 250 nm and having a double layer structure comprising the core comprising a TFE homopolymer and the shell comprising a modified PTFE produced from tetrafluoroethylene [TFE] and 0.2% by mass of chlorotrifluoroethylene [CTFE] relative to the total mass of TFE and CTFE was used in lieu of the core/shell TFE-based polymer (I) and that the dispersant addition level was adjusted to 7.6% by mass relative to the main solid matter and the conductive filler addition level to 3.0% by volume relative to the main solid matter. Coating films were formed from the coating composition obtained and measured for various physical properties. The results are shown in Table 5.

EXAMPLE 16

Concentration and preparation were carried out in the same manner as in Example 14 except that a TFE homopolymer with a number average molecular weight of 5,500,000 and an average particle size of 250 nm was used in lieu of the core/shell TFE-based polymer (I) and that the dispersant addition level was adjusted to 6.5% by mass relative to the main solid matter and the conductive filler addition level to 1.0% by volume relative to the main solid matter. Coating films were formed from the coating composition obtained and measured for various physical properties. The results are shown in Table 5.

EXAMPLE 17

Concentration and preparation were carried out in the same manner as in Example 14 except that Noigen TDS-80, which was used in Example 8, was used as the dispersant and that the dispersant addition level was adjusted to 8.7% by mass relative to the main solid matter and the conductive filler addition level to 5.0% by volume relative to the main solid matter. Coating films were formed from the coating composition obtained and measured for various physical properties. The results are shown in Table 5.

EXAMPLE 18

Concentration and preparation were carried out in the same manner as in Example 14 except that Noigen SD-70, which was used in Example 7, was used as the dispersant and that the dispersant addition level was adjusted to 7.6% by mass relative to the main solid matter and the conductive filler addition level to 3.0% by volume relative to the main solid matter. Coating films were formed from the coating composition obtained and measured for various physical properties. The results are shown in Table 5.

EXAMPLE 19

Concentration and preparation were carried out in the same manner as in Example 14 except that DKS NL-Dash 410, which was used in Example 9, was used as the dispersant and that the dispersant addition level was adjusted to 9.2% by mass relative to the main solid matter and the conductive filler addition level to 6.0% by volume relative to the main solid matter. Coating films were formed from the coating composition obtained and measured for various physical properties. The results are shown in Table 5.

EXAMPLE 20

Concentration and preparation were carried out in the same manner as in Example 14 except that Lutensol TO-10, which was used in Example 10, was used as the dispersant and that the dispersant addition level was adjusted to 11.3% by mass relative to the main solid matter and the conductive filler addition level to 10.0% by volume relative to the main solid matter. Coating films were formed from the coating composition obtained and measured for various physical properties. The results are shown in Table 5.

EXAMPLE 21

A coating composition was prepared in the same manner as in Example 14 except that it was prepared according to the formulation 4 given in Table 4 using a TFE copolymer [PFA] having an average particle size of 200 nm and produced from TFE and 3.5% by mass of PPVE relative to the total mass of TFE and PPVE in lieu of the core/shell TFE-based polymer (I) and that the dispersant addition level was adjusted to 8.8% by mass relative to the main solid matter and the conductive filler addition level to 5.0% by volume relative to the main solid matter. Coating films were formed from the coating composition obtained and measured for various physical properties. The results are shown in Table 5.

EXAMPLE 22

A coating composition was prepared in the same manner as in Example 21 except that a TFE copolymer [PEP] having an average particle size of 150 nm and produced from TFE and 13.2% by mass of hexafluoropropylene [HFP] relative to the total mass of TFE and HFP was used in lieu of the core/shell TFE-based polymer (I). Coating films were formed from the coating composition obtained and measured for various physical properties. The results are shown in Table 5.

EXAMPLE 23

Concentration and preparation were carried out in the same manner as in Example 14 except that 5.0% by volume, relative to the main solid matter, of Toka Black #5500 (trademark, acetylene black, product of Tokai Carbon Co.) was used as the conductive filler and that the dispersant addition level was adjusted to 8.7% by mass relative to the main solid matter. Coating films were formed from the coating composition obtained and measured for various physical properties. The results are shown in Table 5.

EXAMPLE 24

Concentration and preparation were carried out in the same manner as in Example 14 except that 6.0% by volume, relative to the main solid matter, of Conductex 975 (trademark, furnace black, product of Columbia Carbon) was used as the conductive filler and that the dispersant addition level was adjusted to 9.2% by mass relative to the main solid matter. Coating films were formed from the coating composition obtained and measured for various physical properties. The results are shown in Table 5.

EXAMPLE 25

Concentration and preparation were carried out in the same manner as in Example 14 except that 10.0% by volume, relative to the main solid matter, of DCB-250 (trademark, graphite, product of Nippon Graphite Industries) was used as the conductive filler and that the dispersant addition level was adjusted to 11.3% by mass relative to the main solid matter. Coating films were formed from the coating composition obtained and measured for various physical properties. The results are shown in Table 5.

COMPARATIVE EXAMPLE 6

Concentration and preparation were carried out in the same manner as in Example 14 except that Leocol TD-90, which was used in Example 11, was used as the dispersant. Coating films were formed from the coating composition obtained and measured for various physical properties. The results are shown in Table 5.

COMPARATIVE EXAMPLE 7

Concentration and preparation were carried out in the same manner as in Example 14 except that Nonion EAD-13, which was used in Comparative Example 2, was used as the dispersant and that the dispersant addition level was adjusted to 7.6% by mass relative to the main solid matter and the conductive filler addition level to 3.0% by volume relative to the main solid matter. Coating films were formed from the coating composition obtained and measured for various physical properties. The results are shown in Table 5.

COMPARATIVE EXAMPLE 8

Concentration and preparation were carried out in the same manner as in Example 16 except that Leocol TD-90, which was used in Example 11, was used as the dispersant. Coating films were formed from the coating composition obtained and measured for various physical properties. The results are shown in Table 5.

COMPARATIVE EXAMPLE 9

Concentration and preparation were carried out in the same manner as in Example 21 except that Leocol TD-90, which was used in Example 11, was used as the dispersant. Coating films were formed from the coating composition obtained and measured for various physical properties. The results are shown in Table 5.

COMPARATIVE EXAMPLE 10

Concentration and preparation were carried out in the same manner as in Example 22 except that Leocol TD-90, which was used in Example 11, was used as the dispersant. Coating films were formed from the coating composition obtained and measured for various physical properties. The results are shown in Table 5.

Method of Measurement

<Surface Resistivity>

The coating compositions obtained in Examples 14 to 25 and Comparative Examples 6 to 10 were each applied, by spraying, onto insulating glass sheets to give a film thickness of 5 to 10 µm. After 15 minutes of drying at 80° C., the films were baked at 380° C. for 20 minutes. The surface of each coating film obtained was measured for surface resistivity using Hiresta UP (trademark, product of Dia Instruments Co.).

TABLE 4

| Composition 3 | Mass(g) | Composition 4 | Mass(g) |
|---|---|---|---|
| TFE-based polymer dispersion | 76 | TFE-based polymer dispersion | 72 |
| Conductive filler | 1~12 | Conductive filler | 1~12 |
| Thickening agent | 2.5 | Thickening agent | 4 |
| Sodium lauryl sulfate | 0.5 | Methylcellulose | 0.2 |
| Toluene | 2 | Water | 23.8 |
| Water | 19 | | |

Thickening agent (special thickening agent, product of Daikin Industries)
Sodium lauryl sulfate (product of New Japan Chemical),
Methylcellulose (product of Matsumoto Yushi Seiyaku)

TABLE 5

| | | TFE-based polymer | Average particle size (nm) | Dispersant | | | Conductive filler Species Addition level (% by volume) | Cracking limit film thickness (μm) | Surface roughness [Ra] (μm) | Gloss (%) [60°/60°] | Surface resistivity (Ω/□) |
|---|---|---|---|---|---|---|---|---|---|---|---|
| | | Species | Average molecular weight (×10$^4$) | Species | 50% Decompn temp. (° C.) | Addition level (% by mass) | | | | | |
| Example | 14 | Core/shell TFE-based polymer (I) | 250 750 | | 290 | 7.3 | Ketjen black 2.5 | 25 | 0.3 | 26 | 2 × 10$^5$ |
| | 15 | Core/shell TFE-based polymer (II) | 250 500 | | 290 | 7.6 | Ketjen black 3.0 | 25 | 0.3 | 28 | 1 × 10$^5$ |
| | 16 | TFE homopolymer | 250 550 | | 290 | 6.5 | Ketjen black 1.0 | 30 | 0.25 | 22 | 6 × 10$^7$ |
| | 17 | Core/shell TFE-based polymer (I) | 250 750 | | 270 | 8.7 | Ketjen black 5.0 | 23 | 0.35 | 25 | 3 × 10$^3$ |
| | 18 | Core/shell TFE-based polymer (I) | 250 750 | | 265 | 7.6 | Ketjen black 3.0 | 28 | 0.3 | 27 | 6 × 10$^5$ |
| | 19 | Core/shell TFE-based polymer (I) | 250 750 | | 290 | 9.2 | Ketjen black 6.0 | 22 | 0.4 | 23 | 1 × 10$^3$ |
| | 20 | Core/shell TFE-based polymer (I) | 250 750 | | 300 | 11.3 | Ketjen black 10.0 | 20 | 0.4 | 20 | 2 × 10$^2$ |
| | 21 | PFA | 200 80 | | 290 | 8.8 | Ketjen black 5.0 | 26 | 0.3 | 30 | 2 × 10$^5$ |
| | 22 | FEP | 150 55 | | 290 | 8.8 | Ketjen black 5.0 | 22 | 0.35 | 32 | 2 × 10$^5$ |
| | 23 | Core/shell TFE-based polymer (I) | 250 750 | | 290 | 8.7 | Acetylene black 5.0 | 30 | 0.3 | 30 | 2 × 10$^5$ |
| | 24 | Core/shell TFE-based polymer (I) | 250 750 | | 290 | 9.2 | Furnace black 6.0 | 35 | 0.3 | 28 | 2 × 10$^5$ |
| | 25 | Core/shell TFE-based polymer (I) | 250 750 | | 290 | 11.3 | Graphite 10.0 | 28 | 0.3 | 26 | 2 × 10$^5$ |
| Compar. Ex. | 6 | Core/shell TFE-based polymer (I) | 250 750 | | 245 | 7.3 | Ketjen black 2.5 | 12 | 0.6 | 13 | 8 × 10$^5$ |
| | 7 | Core/shell TFE-based polymer (I) | 250 750 | | 245 | 7.6 | Ketjen black 3.0 | 10 | 0.8 | 12 | 5 × 10$^5$ |
| | 8 | TFE homopolymer | 250 550 | | 245 | 6.5 | Ketjen black 1.0 | 16 | 0.5 | 12 | 4 × 10$^8$ |
| | 9 | PFA | 200 80 | | 245 | 8.8 | Ketjen black 5.0 | 5 | 1.3 | 8 | 9 × 10$^5$ |
| | 10 | FEP | 150 55 | | 245 | 8.8 | Ketjen black 5.0 | 6 | 1.2 | 9 | 7 × 10$^5$ |

As the results shown in Table 5 indicate, the coating compositions of Examples 14 to 25, in which the aliphatic polyoxyalkylene ether dispersants used had a 50% decomposition temperature of not lower than 250° C., gave coating films superior in cracking limit film thickness, surface roughness and gloss as compared with the coating compositions of Comparative Examples 6 to 10, in which the dispersants used had a 50% decomposition temperature of lower than 250° C. In particular, the coating composition of Example 21, in which a PFA was used as the TFE-based polymer, and the coating composition of Example 22, in which a FEP was used as the TFE-based polymer, gave coatings markedly improved in cracking limit film thickness, surface roughness and gloss as compared with the coating composition of Comparative Example 9 and the coating composition of Comparative Example 10, in which respectively the same TFE-based polymers were used.

Further, as the results shown in Table 3 and Table 5 indicate, those remarkable deteriorations in various physical properties resulting from the addition of conductive fillers were suppressed with the conductive filler-containing coatings of Examples 14 to 25 although they were slightly inferior in cracking limit film thickness, surface roughness and gloss to the coating films of Examples 1 to 13 which contained no conductive filler.

EXAMPLE 26

To a dispersion of as-polymerized polymers containing 30% by mass of a tetrafluoroethylene homopolymer (TFE homopolymer; number average molecular weight 2,000, 000, average particle size 0.20 μm) as a fluoropolymer was added Lutensol TO-8 as a concentration aid in an amount of about 0.14% by mass relative to the mass of the TFE homopolymer solid matter. The mixture was allowed to stand at a temperature of 70° C. for about 48 hours. After sedimentation of the TFE homopolymer particles, the supernatant was removed, and an about 70% (by mass) of TFE homopolymer concentrate was obtained. On that occasion, the amount of the surfactant adsorbed on the polymer was 2.99% by mass.

To this TFE homopolymer concentrate was added the above-mentioned Lutensol TO-8 to a concentration of about 6% by mass relative to the mass of the TFE homopolymer solid matter. The solid matter concentration was adjusted to about 60% by mass by adding pure water and, further, the mixture was adjusted to pH=9.5 with aqueous ammonia to give an aqueous dispersion of the TFE homopolymer. This aqueous dispersion had a viscosity at 25° C. of 22 mPa·s and a viscosity at 40° C. of 18 mPa·s. The aqueous dispersion obtained was evaluated by the following methods. The results are shown in Table 6 and Table 7.

Evaluation Methods

<Processability>

Using an impregnator, a plain weave glass cloth (yarn density: lengthwise 42/25 mm×crossways 32/25 mm×thickness 0.18 mm) was impregnated with the above aqueous dispersion. After drying at 90° C., the cloth was heated at 380° C. for 1 minute. This procedure was repeated three times, and the processability of the above aqueous dispersion was evaluated in terms of re-coat applicability (wettability) by visual observation.

The evaluation criteria were as follows:
O: No cissing, impregnation possible;
Δ: A slight extent of cissing;
X: Impregnation impossible due to cissing.

<Odor Emanation (Upon Heating)>

Following the same procedure as mentioned above, the glass cloth was impregnated with the above aqueous dispersion, dried and then heated at a temperature not lower than the melting point. The odor emanation was evaluated by three operators, and the evaluations by the three were put together. The evaluation criteria were as follows:
O: Little odor emanation;
Δ: Slight odor emanation;
X: Irritating odor emanation.

<Mechanical Stability>

A 100-ml portion of the above aqueous dispersion was maintained at 25° C. and, after 2 hours of circulation at 200 ml/minute using a roller pump equipped with a Tygon tube (inside diameter 4.8 mm, outside diameter 7.9 mm), it was filtered through a 200-mesh SUS net, and the mesh-up amount (% by mass relative to the mass of the fluoropolymer solid matter) was determined.

EXAMPLE 27

A modified PTFE-based aqueous dispersion was prepared in the same manner as in Example 26 except that particles (average particle size 0.24 μm) having a double-layer structure the core of which was the TFE homopolymer used in Example 26 and the shell of which was a modified polytetrafluoroethylene species obtained by copolymerization of TFE and 0.1% by mass of a perfluoroalkylvinylether [PAVE] relative to the total mass of TFE and PAVE (modified PTFE; number average molecular weight 7,500,000) were used as the fluoropolymer. The thus-obtained modified PTFE-based aqueous dispersion was evaluated in the same manner as in Example 26. The results are shown in Table 6.

EXAMPLE 28

An aqueous dispersion was prepared in the same manner as in Example 26 except that the modified PTFE used in Example 27 was used as the fluoropolymer and that the surfactant addition level was adjusted to about 4% by mass relative to the mass of the modified PTFE solid matter. The thus-obtained modified PTFE-based aqueous dispersion was evaluated in the same manner as in Example 26. The results are shown in Table 6.

COMPARATIVE EXAMPLES 11 TO 16

TFE homopolymer-based aqueous dispersions were prepared in the same manner as in Example 26 except that the surfactants specified in Table 5 and Table 6 were respectively used in lieu of Lutensol TO-8, which was used in Example 26. The thus-obtained modified TFE homopolymer-based aqueous dispersions were evaluated in the same manner as in Example 26. The results obtained in Comparative Examples 11, 12 and 15 are shown in Table 6, and the results of Comparative Examples 13, 14 and 16 in Table 7.

The results of surfactant evaluation as shown in Table 6 and Table 7 were obtained by the following methods:
Surfactant surface tension: A 0.1% aqueous solution of each surfactant was prepared and the surface tension thereof was measured at 25° C. using a tensiometer.

Surfactant cloud point: A 1.0% aqueous solution of each surfactant was prepared and the temperature at which the solution became turbid as a result of raising temperature was determined.

Surfactant thermal degradability: Each surfactant (about 10 mg) was measured for oxidative degradation percentage at 200° C. and for 50% decomposition temperature according to the methods of Reference Examples 1 and 2.

TABLE 6

| | | | Example | | | Comparative Example | | |
|---|---|---|---|---|---|---|---|---|
| | | | 26 | 27 | 28 | 11 | 12 | 15 |
| | Fluoro resin | | TFE homopolymer | Modified PTFE (Core/shell structure) | Modified PTFE (Single layer structure) | TFE homopolymer | TFE homopolymer | TFE homopolymer |
| Surfactant | | Species | Lutensol TO-8 | Lutensol TO-8 | Noigen TDS-80 | Dispanol TOC | Leocol TD-90 | Nonion C-13 |
| | Structure | Number of carbon atoms in alkyl group | 13 (branched) | 13 (branched) | 13 (branched) | 13 (branched) | 13 (branched) | 13 (straight) |

TABLE 6-continued

|  |  | Example | | | Comparative Example | | |
| --- | --- | --- | --- | --- | --- | --- | --- |
|  |  | 26 | 27 | 28 | 11 | 12 | 15 |
| | Number of oxyethylene groups | 8 | 8 | 8 | 8.5 | 9 | 9 |
| | Number of oxypropylene groups | 0 | 0 | 0 | 0 | 0 | 0 |
| | Alkyl group derived from | Butene | Butene | Butene | Propylene/butene | Propylene/butene | Unknown |
| | Average number of branches in alkyl (determined by NMR) | 2.1 | 2.1 | 2.1 | 3.0 | 3.0 | Unknown |
| | Purity (% by mass) | 99 | 99 | 99 | 60 | 60 | 99 |
| | HLB | 13.0 | 13.0 | 13.0 | 13.0 | 13.3 | 13.3 |
| | Surface tension(0.1% aq)(mN/m) | 28.1 | 28.1 | 28.1 | 27.2 | 27.7 | 30.8 |
| | Cloud point | 60° C. | 60° C. | 60° C. | 49° C. | 61° C. | 76.5° C. |
| | 50% Decomposition temperature (° C.) | 290 | 290 | 271 | 245 | 245 | 290 |
| Oxidative degradation percentage (20° C.)(%) | Air | 3.8 | 3.8 | 4.7 | 11.7 | 11.7 | — |
| | N₂ | 3.3 | 3.3 | 3.1 | 6.8 | 6.8 | — |
| | Difference(Air – N₂) | 0.5 | 0.5 | 1.6 | 4.9 | 4.9 | — |
| Resin solid matter (% by mass) | | 60.6 | 60.3 | 61.3 | 60.3 | 60.2 | 60.4 |
| Surfactant addition level (% by mass) | | 6.1 | 6.0 | 3.5 | 5.8 | 6.0 | 6.0 |
| Dispersion viscosity(25° C.)(mPa s) | | 22 | 21 | 24 | 19 | 23 | 28 |
| Mechanical stability (% by mass) | | 1.7 | 1.8 | 3.5 | 2.1 | 2.1 | 15.0 |
| Odor emanation (upon heating) | | ◯ | ◯ | ◯ | X | X | ◯ |
| Processability | | ◯ | ◯ | ◯ | ◯ | ◯ | X |

TABLE 7

|  |  |  | Comparative Example | | |
| --- | --- | --- | --- | --- | --- |
|  |  |  | 13 | 14 | 16 |
| Surfactant | Fluororesin | | TFE homopolymer | TFE homopolymer | TFE homopolymer |
| | Species | | NonionEH205.5 | Emulgen 109P | LeoxWC-145 |
| | Structure | Number of carbon atoms in alkyl group | 8 (straight) | 12 (straight) | 18 (straight) |
| | | Number of oxyethylene groups | 5 | 9 | 14.5 |
| | | Number of oxypropylene groups | 0 | 0 | 0 |
| | HLB | | 12.8 | 13.6 | 14.2 |
| | Surface tension (0.1% aq) (mN/m) | | 31 | 30.7 | 26.9 |
| | Cloud point | | 62° C. | 83° C. | 75° C. |
| Resin solid matter (% by mass) | | | 60.4 | 60.1 | 60.4 |
| Surfactant addition level (% by mass) | | | 6.3 | 6.0 | 6.0 |
| Dispersion viscosity(25° C.)(mPa s) | | | 24 | 24 | 19 |
| Mechanical stability (% by mass) | | | >20 | 10.2 | >20 |
| Odor emanation (upon heating) | | | ◯ | Δ | ◯ |
| Processability | | | X | Δ | X |

As is evident from the data shown in Table 6 and Table 7, the aqueous dispersion of Comparative Examples 11 to 16 failed to attain a balance between odor emanation suppression upon heating and processability and were poor in mechanical stability, whereas the fluororesin aqueous dispersion compositions of Examples 26 to 28 were excellent in mechanical stability and processability and the odor emanation therefrom was suppressed even on the occasion of heating.

EXAMPLE 29

Concentration was carried out for 48 hours in the same manner as in Example 26 except that a TFE/PAVE copolymer (PFA; number average molecular weight 400,000, average particle size 0.15 μm) obtained by copolymerizing TFE and a PAVE (3.5% by mass, relative to the total mass of TFE and PAVE) was used in lieu of the TFE homopolymer used in Example 26. The resulting PFA solid matter content was 68% by mass. Lutensol TO-8, which was used in Example 26, was added to the above PFA concentrate to an addition level of 6% by mass relative to the mass of the PFA solid matter, the solid matter concentration was then adjusted to 60% by mass using pure water and, further, the pH was adjusted to 9.3 using aqueous ammonia to give a PFA-based aqueous dispersion.

To 100 parts by mass of the PFA-based aqueous dispersion obtained were added 4 parts by mass of a polycarboxylic acid (product of NOF Corporation, Polystar OM), 7 parts by mass of ethylene glycol and 3 parts by mass of mineral spirit, and the solid matter concentration was further adjusted to 50% by mass by adding pure water to give an enamel coating. A primer (product of Daikin Industries, Polyflon Enamel EK-1909S-201) was applied, by spraying, to aluminum sheets degreased, blasted and further degreased in advance, and the primer coating films were dried for 10 minutes under infrared irradiation. The above-mentioned enamel coating was applied onto the primer layer by spraying and, after 10 minutes of drying under infrared irradiation, the coatings were baked at 400° C. for 20 minutes. This enamel coating was evaluated in the following manner. The results are shown in Table 8.

Evaluation Methods

<Viscosity>

The viscosity of the enamel coating was measured just after preparation and after the lapse of 1 day, 1 month, and 3 months, on a type B viscometer (product of Tokyo Keiki) at the liquid temperature of 25° C. using a No. 1 rotor.

<Applicability>

Using a self weight type spray coater with a nozzle diameter of 1.0 mm, the above-mentioned enamel coating was applied to the surface resulting from application of a primer (product of Daikin Industries, Polyflon Enamel EK-1909S-201) at a pressure of 0.2 MPa, and the state of the coatings resulting from application of the above enamel coating was observed by the eye. The evaluation criteria were as follows:

O: No cissing;
Δ: A slight extent of cissing;
X: Marked cissing.

<Odor Emanation (Upon Heating)>

Four 50 cm² aluminum sheets were coated with the composition in the same manner as described in Example 26 and heated at a temperature not lower than the melting point and evaluated for odor emanation.

EXAMPLE 30

Concentration was carried out in the same manner as in Example 26 except that a TFE/HFP copolymer (FEP; number average molecular weight 300,000, average particle size 0.13 μm) obtained by copolymerizing TFE and hexafluoropropylene [HEP] (13% by mass relative to the total mass of TFE and HEP) was used in lieu of the TFE homopolymer used in Example 26. The resulting FEP concentrate had a solid matter content of 68% by mass. Lutensol TO-8, which was used in Example 26, was added to the FEP concentrate to an addition level of 6% by mass relative to the mass of the FEP solid matter, the solid matter concentration was then adjusted to 60% by mass using pure water and, further, the pH was adjusted to 9.6 using aqueous ammonia to give a FEP-based aqueous dispersion. Using the FEP-based aqueous dispersion obtained, an enamel coating with a solid matter concentration of 50% by mass was prepared and evaluated in the same manner as in Example 29. The results are shown in Table 8.

COMPARATIVE EXAMPLE 17

An enamel coating was prepared and evaluated in the same manner as in Example 29 except that Leocol TD-90 was used in lieu of Lutensol TO-8, which was used in Example 29. The results are shown in Table 8.

TABLE 8

|  |  | Example | | Compar. Ex. |
| --- | --- | --- | --- | --- |
|  |  | 29 | 30 | 17 |
| Fluoronresin | | PFA | FEP | PFA |
| Surfactant | | Lutensol TO-8 | Lutensol TO-8 | Leocol TD-90 |
| Viscosity (mPa s/ 25° C.) | Just after preparation | 260 | 210 | 265 |
|  | After 1 day | 265 | 220 | 230 |
|  | After 1 month | 250 | 200 | 195 |
|  | After 3 months | 245 | 200 | 180 |
| Applicability | | O | O | O |
| Odor | Upon heating | O | O | X |

As the results shown in Table 8 indicate, the enamel coatings of Examples 29 and 30 were stable and showed little change in viscosity even after the lapse of the specified periods of time. They were excellent in applicability and could be applied for forming thick coatings without allowing cracking.

They allowed only suppressed odor emanation even on the occasion of heating.

INDUSTRIAL APPLICABILITY

The fluororesin aqueous dispersion composition (1), fluororesin aqueous dispersion composition (2) and fluorine-containing aqueous coating composition of the present invention are excellent in film-forming properties and can give coatings having good luster and, furthermore by appropriately selecting the aliphatic polyoxyalkylene ether dispersant, coatings suppressed the odor emanation and improved in dispersibility, mechanical stability and processability. Further, each of the above-mentioned compositions is excellent in coatings leveling properties even when a conductive filler is incorporated therein and, therefore, can be suitably used also in producing conductive sliding members of household electric appliances and the like.

The invention claimed is:

1. A fluororesin aqueous dispersion composition comprising a tetrafluoroethylene-based polymer and an aliphatic polyoxyalkylene ether dispersant incorporated therein, wherein said aliphatic polyoxyalkylene ether dispersant shows a 50% decomposition temperature of not lower than 250° C. and is represented by the following general formula:

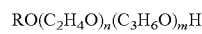

RO(C₂H₄O)$_n$(C₃H₆O)$_m$H wherein R is an alkyl group represented by —C$_{13}$H$_{27}$ with an average number of branches of 1.5 to 2.9 per molecule, n represents an integer of 3 to 25 and m represents an integer of 0 to 6.

2. The fluororesin aqueous dispersion composition according to claim 1, wherein the aliphatic polyoxyalkylene ether dispersant shows an oxidative degradation percentage of not higher than 2% at 200° C.

3. The fluororesin aqueous dispersion composition according to claim 1, wherein the tetrafluoroethylene-based polymer is a copolymer of tetrafluoroethylene and a fluoroalkylvinylether, said fluoroalkylvinylether accounting for 0.001 to 0.5% relative to the total mass of said tetrafluoroethylene and said fluoroalkylvinylether.

4. The fluororesin aqueous dispersion composition according to claim 1, wherein the tetrafluoroethylene-based polymer forms a core/shell structure with the core comprising a modified polytetrafluoroethylene (A) or a tetrafluoroethylene homopolymer and with the shell comprising a modified polytetrafluoroethylene (B).

5. The fluororesin aqueous dispersion composition according to claim 1, which further contains an electrically conductive filler incorporated therein.

6. The fluororesin aqueous dispersion composition according to claim 5, wherein the electrically conductive filler accounts for 0.1 to 15% by volume relative to the volume of the main solid matter.

7. The fluororesin aqueous dispersion composition according to claim 5, wherein the electrically conductive filler is a conductive carbon filler.

8. A fluororesin aqueous dispersion composition comprising a fluoropolymer and a polyoxyalkylene isotridecyl ether surfactant,
wherein said composition comprises a fluororesin aqueous dispersion,
a solid matter in said fluoropolymer accounts for 30 to 70% by mass relative to the total mass of the fluororesin aqueous dispersion, and
said polyoxyalkylene isotridecyl ether surfactant accounts for 1 to 21% by mass relative to the mass of the solid matter of the fluoropolymer and is represented by the following general formula (I):

R—O-A-H    (I)

wherein R is an alkyl group represented by —$C_{13}H_{27}$ with an average number of branches of 1.5 to 2.9 per molecule and A represents a polyoxyalkylene chain having 5 to 20 oxyethylene groups and 0 to 6 oxypropylene groups.

9. The fluororesin aqueous dispersion composition according to claim 8, wherein a raw material alcohol of the polyoxyalkylene isotridecyl ether surfactant is synthesized by the oxo process from an olefin containing 12 carbon atoms as obtained by trimerization of butene.

10. A fluorine-containing aqueous coating composition comprising a tetrafluoroethylene-based polymer and an aliphatic polyoxyalkylene ether dispersant incorporated therein,
wherein the aliphatic polyoxyalkylene ether dispersant shows a 50% decomposition temperature of not lower than 250° C. and is represented by the following general formula:

RO$(C_2H_4O)_n(C_3H_6O)_m$H wherein R is an alkyl group represented by —$C_{13}H_{27}$ with an average number of branches of 1.5 to 2.9 per molecule, n represents an integer of 3 to 25 and m represents an integer of 0 to 6.

* * * * *